United States Patent [19]
Kuribayashi et al.

[11] Patent Number: 5,487,926
[45] Date of Patent: Jan. 30, 1996

[54] OPTICAL DISK

[75] Inventors: Isamu Kuribayashi, Saku; Shin-ichi Tezuka, Nagano, both of Japan

[73] Assignee: TDK Corporation, Tokyo, Japan

[21] Appl. No.: 794,977

[22] Filed: Nov. 20, 1991

[30] Foreign Application Priority Data

Nov. 22, 1990 [JP] Japan ................................. 2-320104
Nov. 22, 1990 [JP] Japan ................................. 2-320105

[51] Int. Cl.⁶ .................. F16B 2/00; B32B 3/02; G11B 5/66
[52] U.S. Cl. .................. 428/33; 428/64.1; 428/64.3; 428/64.4; 428/64.9; 428/65.2; 428/308.4; 428/188; 428/336; 428/694 ML; 428/694 AH; 428/694 PR; 428/900; 369/13
[58] Field of Search ........................... 428/694, 64, 900, 428/33, 308.4, 188, 694 ML, 694 AH, 694 PR, 64.1, 64.3, 64.4, 64.9, 65.2; 369/13

[56] References Cited

U.S. PATENT DOCUMENTS 4,800,112  1/1989  Kano et al. ................................ 428/163
4,977,019  12/1990  Schaefer ................................ 428/317.5

FOREIGN PATENT DOCUMENTS 1178146  7/1989  Japan .
1224942  9/1989  Japan .

Primary Examiner—L. Kilman
Attorney, Agent, or Firm—Watson, Cole, Grindle & Watson

[57] ABSTRACT

An optical disk includes a pair of disk substrates and a recording layer on at least one substrate, the disk substrates being mated by bonding the substrates at their inside surfaces through an adhesive layer such that the recording layer is internally enclosed. In one form, a pair of self-adhesive layers are applied to the respective substrate inside surfaces and formed with a plurality of channels extending over the surface from the outer or inner circumferential edge to the outer circumferential edge. The self-adhesive layers are bonded together to integrate the pair of disk substrates in which the channels form passages for allowing air escape. In another form, a pair of adhesive layers are applied to the respective substrate inside surfaces. The pair of disk substrates are joined by bonding the adhesive layers together through a buffer foam sheet.

26 Claims, 11 Drawing Sheets

OPTICAL DISK

This invention relates to optical disks including rewritable optical recording disks such as magneto-optic recording disks and read-only optical disks such as optical video disks.

BACKGROUND OF THE INVENTION

Optical disks such as magneto-optic recording disks include recording layers as information carrying means on disk substrates. In the case of double side recording type, a pair of disk substrates are mated such that the recording layers are sandwiched between the substrates for the purpose of protecting the recording layers against mechanical damage as by scratching.

In bonding paired disk substrates for fabricating integral optical disks, there are used a variety of adhesives including thermal fusion type adhesives such as hot-melt adhesives, reaction type adhesives such as epoxy adhesives and UV-curable adhesives, and pressure-sensitive adhesives or self-adhesives. Usually, such bonding operation is carried out in clean room conditions for the purpose of preventing any contamination of optical disks, for example, by dust and debris existing between disk substrates. The use of hot-melt adhesives requiring heat is not recommended for clean room working. Epoxy adhesives and UV-curable adhesives require a relatively long time to complete bonding and leave the risk that curing agents and sensitizers in the adhesives can cause corrosion of recording layers or information carrying means. For this reason, self-adhesives are advantageous since they are free of the detrimental action and feasible to clean room working.

Use of self-adhesives, however, has some problems. In applying self-adhesive to a disk substrate, air can be confined between the disk substrate and the self-adhesive layer. Such air bubbles causes a lowering of disk substrate bond strength particularly when the substrates are of resin. The completed disks can be locally increased in thickness where air bubbles are entrained, resulting in a loss of mechanical precision or dimensional accuracy. Then the disks will experience a substantial amount of axial runout when rotated, leading to difficult focusing and error occurrence.

It is thus necessary to avoid entrainment of air bubbles by applying self-adhesive in vacuum in mating disk substrates together. Alternatively, air bubbles are removed by high temperature baking. Attachment in vacuum and high temperature baking add complexity or an extra step to the optical disk manufacturing process, and are disadvantageous for mass production.

Where self-adhesive compositions and hot-melt adhesive compositions are used, a pair of disk substrates are joined into an integral disk by applying an adhesive layer on the inside surface of each disk substrate, closely mating the disk substrates through the adhesive layers, and pressing the assembly by means of a pressing machine. If the inside surface or bonding surface of one disk substrate is deformed to present irregularities, the pressing would cause the other disk substrate be deformed in conformity to the irregularities. The resulting disk becomes low in mechanical or dimensional precision and thus experiences noticeable runout upon rotation.

SUMMARY OF THE INVENTION

Therefore, an object of the present invention is to provide an optical disk having a pair of disk substrates integrated through a self-adhesive layer without allowing air bubbles to enter between the disk substrates and the self-adhesive layer and thus preventing any loss of mechanical precision.

Another object of the invention is to provide an optical disk comprising a pair of disk substrates integrated through an adhesive layer and having high mechanical precision.

In a first form of the present invention, there is provided an optical disk comprising a pair of disk substrates each presenting inside and outside surfaces and inner and outer circumferential edges and adapted to be mated such that their inside surfaces face each other, information carrying means on at least one disk substrate inside surface, a pair of self-adhesive layers on the respective substrate inside surfaces. At least one self-adhesive layer is formed with a plurality of channels extending over the surface from the outer or inner circumferential edge to the outer or inner circumferential edge. The self-adhesive layers are bonded together to integrate the pair of disk substrates.

The optical disk may further comprise at least one self-adhesive sheet including a base having first and second major surfaces, the self-adhesive layer on the first major surface, and a second self-adhesive layer on the second major surface. The self-adhesive sheet is attached to either of the disk substrate inside surfaces via the second self-adhesive layer. Preferably, the base is a foam body having a compression hardness of up to 10 kgf/cm$^2$.

The self-adhesive layer may be directly attached to at least one disk substrate inside surface.

The disk substrate inside surface is covered substantially over its entire area with the self-adhesive layer or the second self-adhesive layer.

Each of the self-adhesive layer is formed with a plurality of channels which may be linear and parallel or extend radially between the inner and outer circumferential edges. At the same time, the self-adhesive layer is formed with continuous or discrete lands between the respective two channels. The channels are formed in a density of at least one channel per cm and the lands occupy at least 30% of the surface area, more preferably 30 to 90% of the surface area.

In a second form of the invention, there is provided an optical disk comprising a pair of disk substrates each presenting inside and outside surfaces and adapted to be mated such that their inside surfaces face each other, information carrying means on at least one disk substrate inside surface, and a pair of adhesive layers on the respective substrate inside surfaces. The adhesive layers are bonded through a buffer foam sheet to integrate the pair of disk substrates.

Preferably, the buffer foam sheet having a compression hardness of up to 10 kgf/cm$^2$.

The optical disk may further comprise at least one self-adhesive sheet including a base having first and second major surfaces, the adhesive layer on the first major surface which is formed from a self-adhesive composition, and a second adhesive layer on the second major surface. The adhesive sheet is attached to either of the disk substrate inside surfaces via the second adhesive layer. The adhesive layer may be directly formed on at least one disk substrate inside surface from a self-adhesive composition or a hot-melt adhesive composition. The disk substrate inside surface is covered substantially over its entire area with the adhesive layer or the second adhesive layer.

As in the first form, each adhesive layer is preferably formed with a plurality of channels extending over the surface from the outer or inner circumferential edge to the outer or inner circumferential edge.

As described above, in one preferred embodiment according to the first form of the present invention, self-adhesive layers are applied on the inside surfaces of a pair of disk substrates, respectively, and formed with a plurality of channels. The disk substrates are mated together by bonding the self-adhesive layers together to form an integral optical disk. In another preferred embodiment, self-adhesive sheets each having a self-adhesive layer provided with a plurality of channels are applied to the inside surfaces of a pair of disk substrates, respectively. The disk substrates are mated together by bonding the self-adhesive layers together to form an integral optical disk. In either embodiment, in mating or integrating a pair of disk substrates, air existing between the disk substrates can escape to the outside through the channels in the self-adhesive layers. Consequently, the invention avoids the risk that air bubbles be confined between a pair of disk substrates, more exactly between a disk substrate and a self-adhesive layer or between self-adhesive layers, thus achieving optical disks with high mechanical precision.

In a further preferred embodiment, the self-adhesive layer extends substantially entirely over the inside surface of each of paired disk substrates. As compared with optical disks which are designed so as to prevent entrainment of air bubbles in the disk by partially applying an self-adhesive layer to a disk substrate to provide air flowpaths, typically by forming a stripe pattern of self-adhesive layer, the optical disks of the invention are outstandingly improved in corrosion resistance and durability because the recording layer is entirely sealed and covered with the self-adhesive layer.

It is to be noted that when hot-melt adhesive is directly applied to a disk substrate by means of a roll coater, there is formed an adhesive coating having saw-shaped lands on the surface. In this regard, the use of hot-melt adhesive is effective in preventing entrainment of air bubbles between disk substrates. However, saw-shaped lands present a smaller area of bond, failing to achieve acceptable bond strength although the adhesive material itself has high bond strength.

In the second form, a pair of disk substrates are joined into an integral disk by applying an adhesive layer on the inside surface of each disk substrate, and bonding the adhesive layers through a buffer foam sheet. Even if the inside surface or bonding surface of one disk substrate is deformed to present irregularities, only the side of the buffer sheet facing the irregularities are depressed or deformed during press joint, with the other disk substrate undergoing no deformation. Then the optical disk is accomplished to high mechanical precision very close to the precision of the working surfaces of a pressing machine.

DETAILED DESCRIPTION OF THE INVENTION

Figure 1:
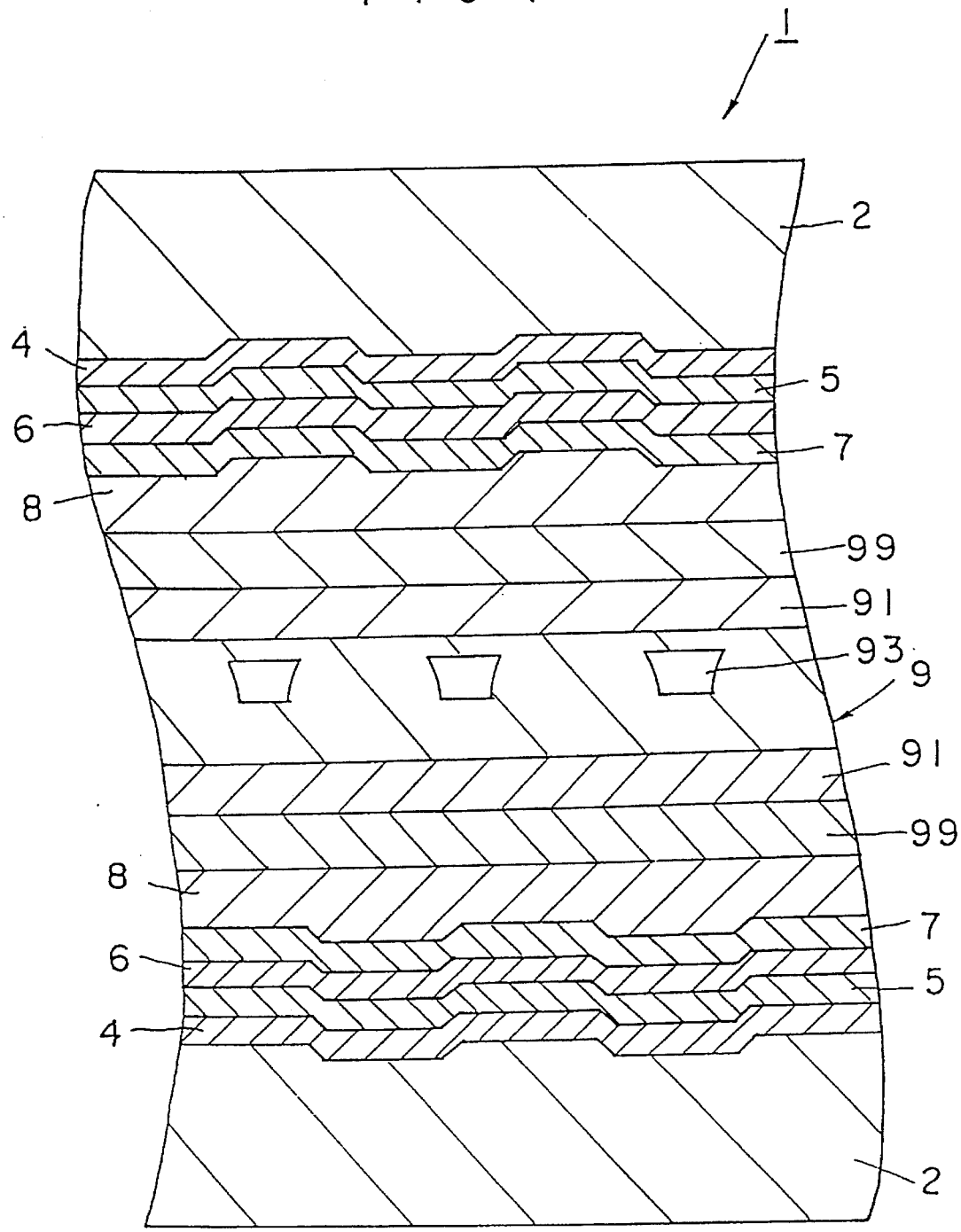
FIG. 1 is a fragmentary cross section of an optical disk according to one embodiment of the invention.

Referring to FIG. 1, there is illustrated a double side recording type magneto-optic recording disk generally designated at 1 as a representative preferred embodiment of the optical disk according to the present invention. The magneto-optic recording disk 1 is shown as including a pair of disk substrates 2 and 2 each having inside and outside major surfaces and inner and outer circumferential edges (not shown in FIG. 1, see FIGS. 6 and 7). On the inside surface of each disk substrate 2, a protective layer 4, an intermediate layer 5, a recording layer 6 as information carrying means, a protective layer 7, and a protective coat 8 are provided in the described order. The pair of disk substrates 2 and 2 are mated such that their inside surfaces face each other and joined via a self-adhesive layer 9 to form an integral disk. The term "inside surface" used herein refers to the inside surface of a disk substrate, but mostly to the surface of the uppermost layer on the disk substrate because some necessary layers have been formed on each disk substrate before the substrates are integrally joined.

The disk substrates 2 are transparent to recording and reproducing light. They are generally formed of resins though they may be of glass if desired. The disk substrates 2 are of disk-shape or annulus, generally having an outer diameter of about 50 to about 360 mm and an inner diameter of about 15 to about 35 mm. Any type of resin may be used, but acrylic resins, polycarbonate, epoxy resins, and polyolefins are preferred. The disk substrates may be formed from such resins by well-known methods. Typically, resin compounds are injection molded into disk substrates in which pits and grooves are concurrently formed in a predetermined pattern for tracking and addressing purposes. Alternatively, disk substrates are first molded and a resin layer having a predetermined pattern of grooves is then formed thereon by 2P method or the like.

On the disk substrate 2 is formed the intermediate layer 5 which is effective for improving C/N ratio. The intermediate layer 5 may be formed of various dielectric materials, preferably to a thickness of about 30 to about 150 nm. In addition to the intermediate layer 5, a similar dielectric material may be formed as the protective layer 7 on the recording layer 6.

Optional are the protective layers 4 and 7 which are effective for improving the corrosion resistance of the recording layer 6. Preferably either one, most preferably both of the protective layers 4 and 7 are provided. They may be inorganic thin films formed of various oxides, carbides, nitrides, sulfides or mixtures thereof or glass. The protective layer is about 30 to about 300 nm thick for corrosion resistance improvement.

Preferably, the protective layers 4 and 7 as well as the intermediate layer 5 are formed by various gas phase film forming techniques, typically sputtering.

The recording layer 6 is adapted to allow information to be recorded magnetically using a modulated thermal beam or modulated magnetic field and the recorded information to be reproduced through magneto-optic conversion. The recording layer 6 may be formed of any desired material insofar as magneto-optic recording is possible. Generally, alloys containing rare earth metals, especially rare earth metal-transition metal alloys are applied by sputtering, evaporation, ion plating or the like, to thereby form amorphous films. The recording layer 6 is usually about 10 to about 500 nm thick.

On the recording layer 6 is provided the protective coat 8 which is effective for improving corrosion resistance and mar resistance. It is preferably formed of various organic materials, more preferably radiation-curable compounds which are cured with electron radiation or UV light. When it is of radiation-cured compounds, The protective coat 8 is generally of about 0.1 to about 100 μm thick and formed by well-known methods such as spin coating, gravure coating, spraying and dipping.

The pair of disk substrates 2 and 2 each having the above-mentioned stack of layers are mated such that their inside surfaces face each other and accordingly, the recording layers 6 are internally enclosed. Particularly, the disk substrates 2 and 2 are joined via the self-adhesive layer 9 to form an integral disk.

The use of self-adhesive layer allows the joint operation to be performed in a clean room. Joinder can be completed briefly and simply by pressing under a pressure of about 1 to 5 kg/cm². Therefore, the joint operation is easy and complete within a short time. The risk of corrosion of the recording layer 6 is eliminated because the self-adhesive is free of a curing agent or sensitizer.

Figure 2:
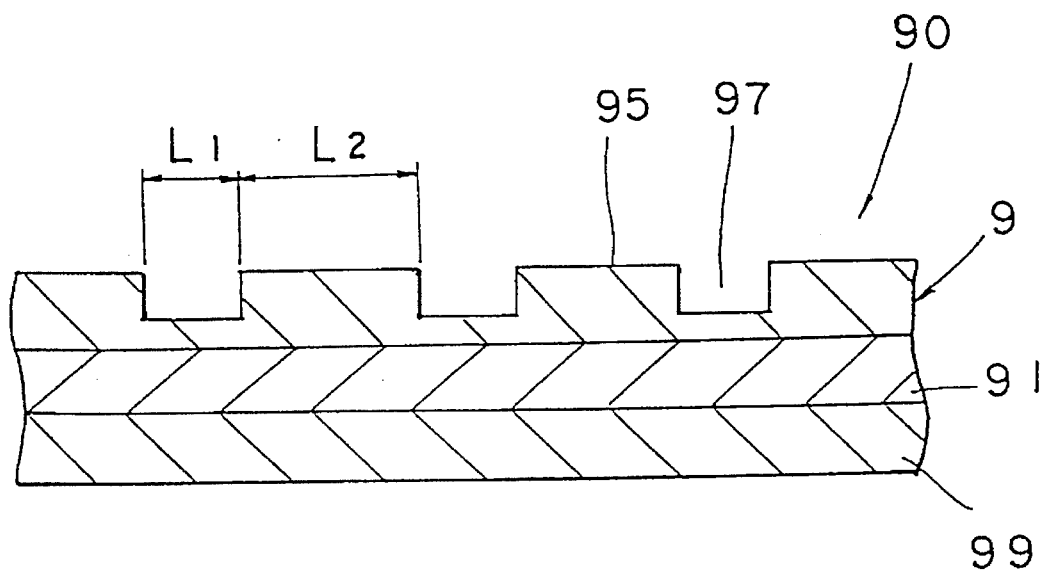
FIG. 2 is a fragmentary cross section of one exemplary self-adhesive sheet used in the optical disk of the invention.

In a first embodiment of the invention, a self-adhesive sheet 90 is additionally used in joining a pair of disk substrates 2 and 2 as shown in FIG. 1. The self-adhesive sheet 90 is shown in FIG. 2 as including a base 91 with first and second major surfaces having the self-adhesive layer 9 on the first major surface and a second self-adhesive layer 99 on the second major surface. More particularly, the self-adhesive sheet 90 has a pair of self-adhesive layers on opposite major surfaces of the base 91, that is, the self-adhesive layer 9 for bonding the paired disk substrates together and the second self-adhesive layer 99 for bonding the self-adhesive sheet 90 to a corresponding disk substrate. If desired, a primer layer may be interposed between the base 91 and the self-adhesive layer 9 or 99.

The self-adhesive sheet 90 is of generally disk shape and of dimensions which may be properly selected in accordance with the dimensions of the disk substrates 2.

No particular limit is imposed on the materials of which the self-adhesive layers 9 and 99, base 91, and optional primer layer are made. Use may be made of the materials commonly used in conventional self-adhesive sheets and self-adhesive compositions. For example, the self-adhesive layers 9 and 99 may be formed of rubber, acryl, silicone, and polyvinyl ether base self-adhesive compositions. These self-adhesive compositions are conventionally composed of a base polymer, tackifier, softener, filler, anti-oxidant, crosslinking agent and other additives. Preferably, the self-adhesive composition used has a specific gravity of about 1.0 to 1.3 and the self-adhesive layers 9 and 99 have a thickness of about 10 to 200 μm before pressing and a thickness of about 10 to 100 after pressing.

For the base 91, various resins may be used, for example, polypropylene, polyvinyl chloride, polyethylene terephthalate, polyimide, cellulose, acetate, tetrafluoroethylene, and epoxy resins. The base 91 is generally about 10 to 50 μm thick.

The primer layer may be formed of MMA-grafted natural rubber, isocyanate blends, chlorinated polypropylene, etc. and have a thickness of about 1 to 100 μm.

In the practice of the invention, the self-adhesive layer 9 of the self-adhesive sheet 90 serving to joining the paired disk substrates is-formed on at least its surface with a plurality of channels 97 which extend from the outer and/or inner circumferential edge to the outer and/or inner circumferential edge over the sheet surface facing the internal region of the disk. In some cases, the channels 97 vertically extend throughout the self-adhesive layer 9 as viewed in FIG. 2 and reach the base 91 so that the self-adhesive layer 9 may be divided into segments. It is to be noted that no channels are formed on the second self-adhesive layer 99 serving to joining the self-adhesive sheet 90 to the disk substrate.

Figure 3:
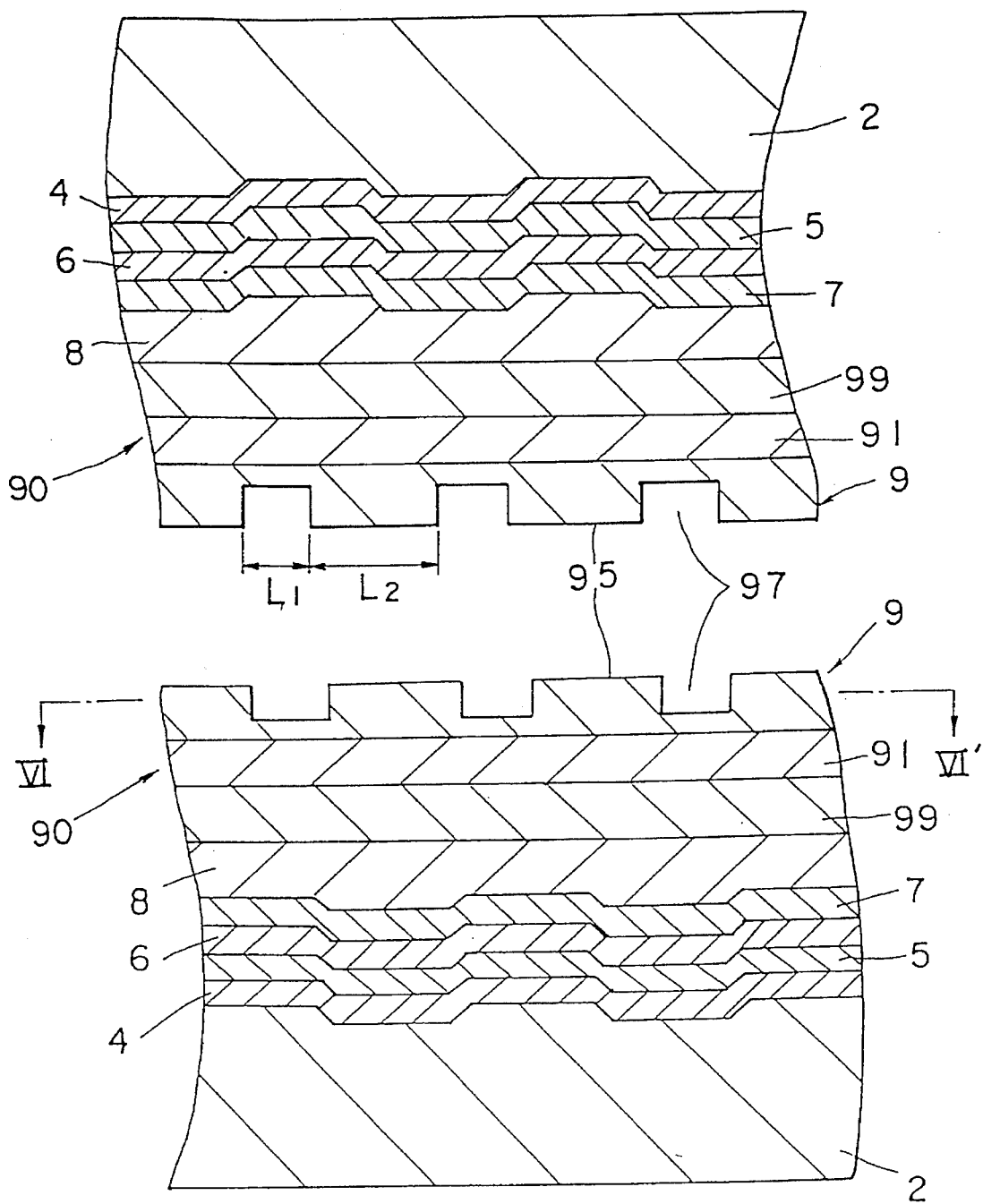
FIG. 3 is a fragmentary cross section of the optical disk of FIG. 1, showing a pair of disk substrates prior to joining.

There are furnished a pair of self-adhesive sheets 90 and 90 each having the channeled self-adhesive layer 9. As shown in FIG. 3, each self-adhesive sheet 90 is attached to the inside surface of one disk substrate 2, more particularly to the protective coat 8, via the second self-adhesive layer 99. It is the channel-free second self-adhesive layer 99 that is bonded to the protective coat 8 and the layer 99 covers substantially the entire area of the protective coat 8.

Next, the pair of disk substrates 2 and 2 are mated by joining together the channeled self-adhesive layers 9 and 9 of the respective self-adhesive sheets 90 and 90 previously secured to the respective disk substrates 2 and 2.

In the embodiment illustrated in FIG. 3, both the self-adhesive layers 9 of the respective self-adhesive sheets 90 are formed with the channels 97 although it suffices that at least one self-adhesive layer 9 be provided with the channels 97.

By mating and joining a pair of disk substrates 2 and 2 of the arrangement shown in FIG. 3 under some pressure, there is obtained an integral disk as shown in FIG. 1 in which communication passages 93 are defined within the self-adhesive layer 9 or between the self-adhesive layer 9 and the base 91 as a consequence of the channels 97. The passages 93 extend from within the disk to the outer and/or inner circumferential edge and are thus open to the exterior, allowing air to escape during joining and thus preventing any entrainment of air bubbles between the disk substrate inner surface and the self-adhesive layer 9 or within the self-adhesive layer 9.

Referring to FIGS. 2 and 3 again, lands 95 are left in the self-adhesive layer 9 between the two adjoining channels 97. Often the lands 95 occupy at least 30% of the surface area of the self-adhesive layer 9. Less than 30% by area of lands 95 provide insufficient bond strength. The benefits of the invention are negated if the lands 95 occupy nearly 100% by area. Therefore, the lands 95 more preferably occupy 30 to 95%, most preferably 50 to 90% of the surface area of the self-adhesive layer 9. The proportion of lands 95 is also defined as the area of lands 95 divided by the area of lands 95 and channels 97 as projected in a thickness direction of the disk substrate 2.

No particular limit is imposed on the shape and pattern of channels 97 formed in self-adhesive layer 9. Illustrated in FIG. 3 are linear channels 97 of rectangular cross-section formed at a predetermined pitch in parallel arrangement. It is to be noted that the cross-sectional shape of communication passages 93 resulting from channels 97 after pressurization is somewhat deformed from the cross-sectional shape of channels 97 before pressurization.

Figure 6:
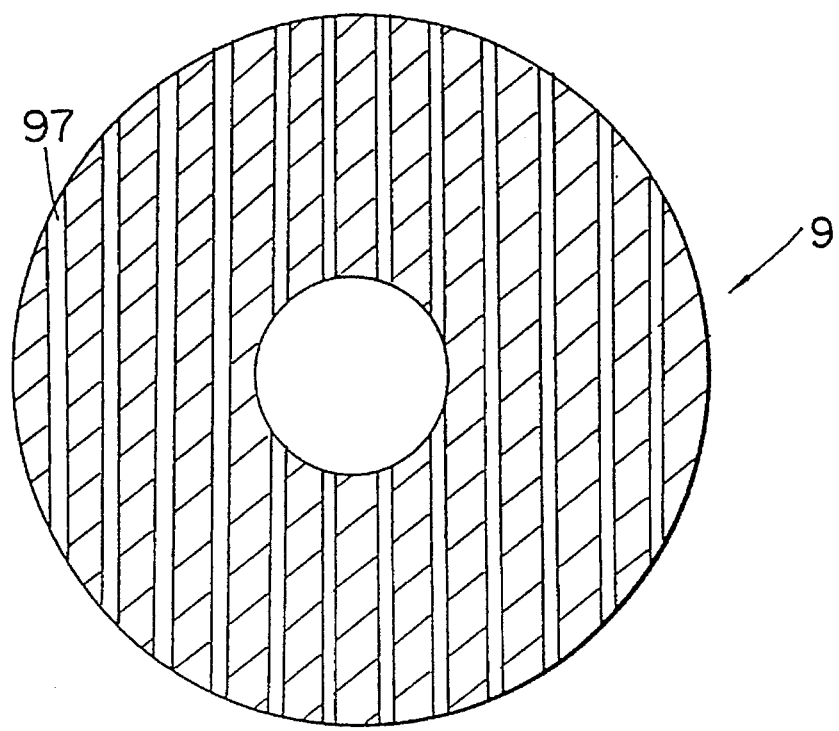
FIG. 6 is a cross section taken along lines VI—VI' in FIG. 3, showing a pattern of parallel channels in the self-adhesive layer of the optical disk.

Illustrated in FIG. 6 is a cross section of the channeled self-adhesive layer 9 taken along lines VI—VI' in FIG. 3. The channels 97 are seen to extend straight from the outer circumferential edge to the outer circumferential edge, with some from the inner circumferential edge to the outer circumferential edge. These linear channels 97 are desirable in that the self-adhesive layer 9 is easy to form and efficient air escape is ensured. The parallel arrangement of channels 97 makes it easy to control the proportion of lands 95 and the pitch of channels 97.

In the embodiment illustrated in FIGS. 3 and 6, the proportion of lands 95 in self-adhesive layer 9 is expressed by L2/(L1+L2) wherein L1 is the width of each channel 97 and L2 is the width of each land 95. As defined above, L2/(L1+L2) is preferably at least 0.3, more preferably from 0.3 to 0.95, most preferably from 0.5 to 0.9.

Preferably, channels 97 are formed at a density of at least one channel per cm. Differently stated, channels are formed at a pitch of up to 1 cm. With a larger pitch, more air bubbles would be entrained if the proportion of lands 95 is high, and the mechanical precision of the disk would be adversely affected if the proportion of lands 95 is low. The preferred pitch ranges from 0.01 to 1 cm, especially from 0.05 to 0.2 cm since it is difficult to form channels 97 at too smaller pitches. With relatively larger pitches within this range, the proportion of lands 95 is increased to prevent a lowering of mechanical precision of the disk. For example, for a pitch of about 0.1 to 1 cm, the proportion of lands 95 should preferably be at least 0.5, more preferably from 0.5 to 0.95. Most often, channels 97 are formed at a constant pitch although varying pitches are acceptable.

The depth of channels 97 is usually at least about 10% of the thickness of self-adhesive layer 9.

In the embodiment shown in FIGS. 1 and 3, a pair of self-adhesive sheets 90, 90 have respective self-adhesive layers 9, 9 which are formed with channels 97 in the same pattern. A pair of disk substrates 2, 2 are joined such that the channels on one side intersect the channels on the other side at an angle of about 90°.

Figure 4:
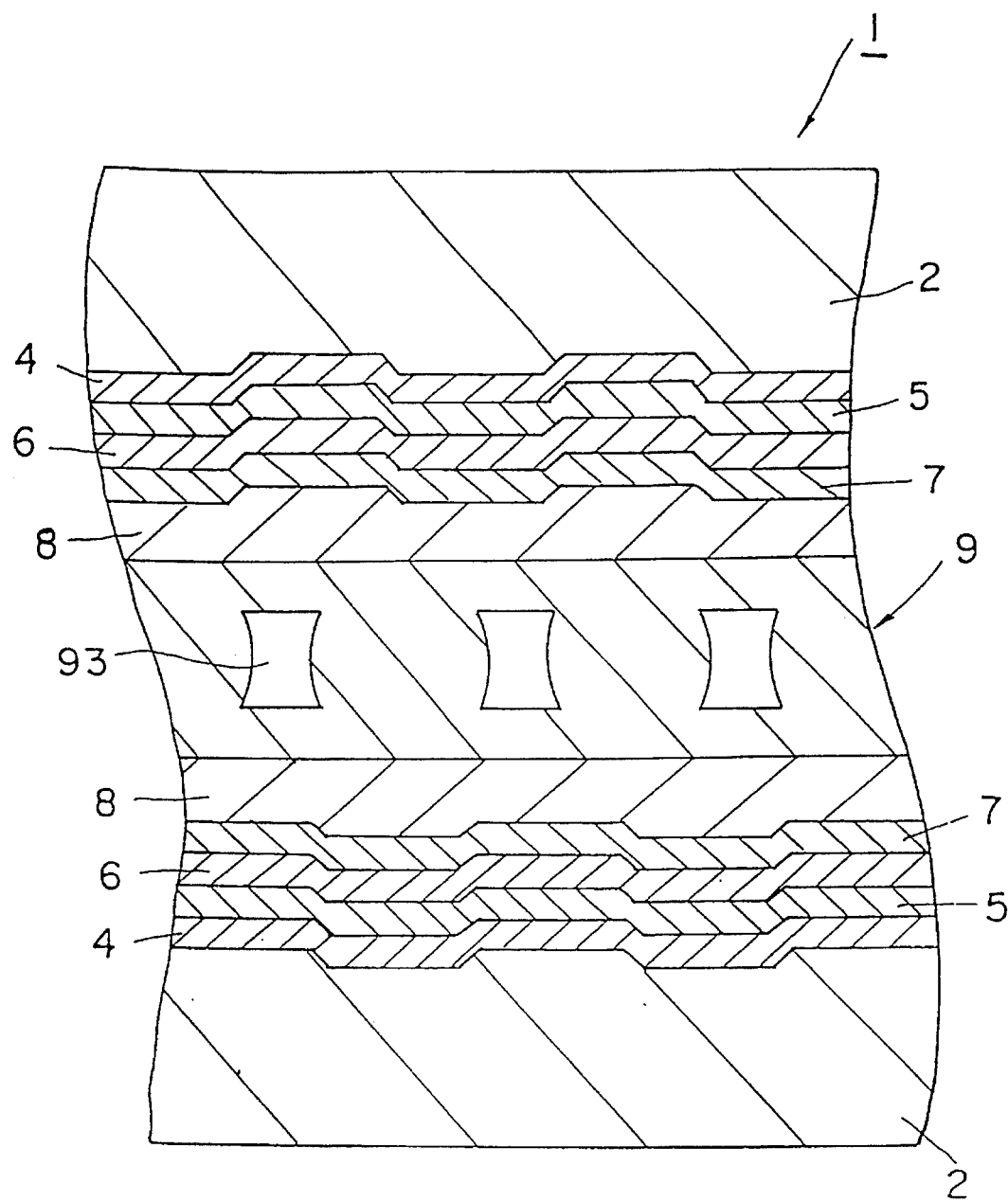
FIG. 4 is a fragmentary cross section of an optical disk according to another embodiment of the invention.

In another embodiment, a pair of disk substrates 2, 2 may be joined such that the channels on one side coincide with the channels on the other side, that is, an intersection angle of 0° as shown in FIG. 4. Preferred for the purpose of achieving higher mechanical precision for the disk is the former embodiment in which a pair of disk substrates 2, 2 are joined such that the channels 97 on one self-adhesive sheet 90 intersect the channels 97 on the other self-adhesive sheet 90 at a certain angle, typically of about 45° to 90°.

Figure 7:
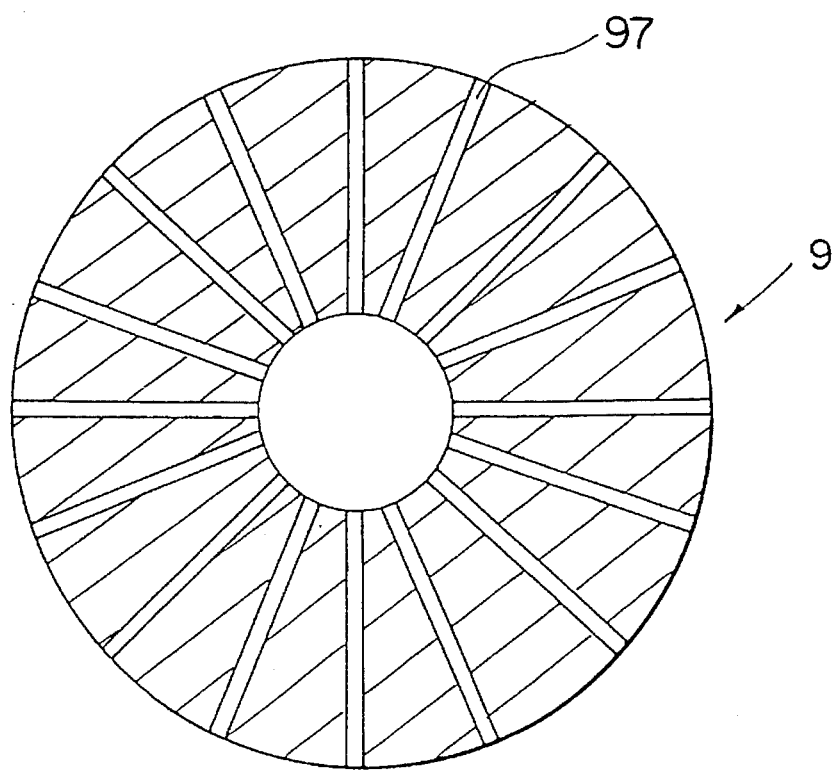
FIG. 7 is a cross section similar to FIG. 6, showing a pattern of radial channels in the self-adhesive layer of the optical disk.

Another pattern of channels 97 in the self-adhesive layer 9 is illustrated in FIG. 7. FIG. 7 is a cross section of the channeled self-adhesive layer 9 similar to FIG. 6. The channels 97 are seen to extend radially from the inner circumferential edge to the outer circumferential edge. As in the former embodiment, the channels 97 are preferably linear and at a constant pitch. The channels 97 are formed at a density of at least one channel per cm, more preferably 1 to 100 channels per cm, most preferably 5 to 20 channels per cm as measured along the outer circumferential edge of the disk substrate. The proportion of lands 95 may be directly determined from the projected areas of lands and channels, but can be expressed in approximate form by an average of L2/(L1+L2) at the outer circumferential edge and L2/(L1+L2) at the inner circumferential edge.

Like the former embodiment, the radial arrangement of channels 97 also has the advantages of easy control of the channel pitch and land proportion, preventing air bubble entrainment.

It is also possible that the self-adhesive layer 9 be provided with lands 95 in discrete island form or dot pattern. Preferably, the proportion of lands 95 is from 0.3 to 0.9, more preferably 0.5 to 0.8. Preferably, discrete land segments each have a surface area of 1 to 1000 mm$^2$, more preferably 10 to 500 mm$^2$, and are present in a population of 0.03 to 95 segments/cm$^2$, more preferably about 0.25 to 9 segments/cm$^2$. With a smaller population of discrete land segments per unit area, for example, of the order of 0.03 to 1 segment/cm$^2$, the proportion of lands 95 in the self-adhesive layer 9 should preferably be 0.5 to 0.95, more preferably 0.7 to 0.9. In the case of discrete land segments, channels starting from the inner circumferential edge, traveling around a land segment and going back to the inner circumferential edge can be contemplated.

The shape and pattern of channels 97 in self-adhesive layer 9 are not limited to the illustrated embodiments. For example, the channels 97 may have a cross-sectional shape of trapezoid, triangle, and semi-circle and the pattern may be curvilinear, polygonal or the like. The channels may be either parallel or non-parallel and can intersect with each other.

Also, the shape and pattern of channels 97 in self-adhesive layers 9, 9 of paired self-adhesive sheets 90, 90 may be the same or different although the identical channels are advantageous for ease of formation. As previously mentioned, the channels on one side are at a certain angle to the channels on the other side when a pair of disk substrates are mated.

Gravure printing or other conventional techniques are used in forming the self-adhesive layer 9. The self-adhesive layer 9 can be channeled or patterned in various ways. One common approach is to apply a self-adhesive composition to the entire surface of a base and to form channels in the self-adhesive layer. It is convenient to use a base having a desired pattern of channels preformed therein. Then by applying a self-adhesive composition to the patterned base, there is obtained a self-adhesive layer in which channels are already defined in conformity to the pattern of the base. The flat surface second self-adhesive layer 99 may be applied by conventional techniques used in the manufacture of self-adhesive sheets.

Using one or a pair of self-adhesive sheets 90 as mentioned above, a pair of disk substrates 2, 2 are integrated. For example, a self-adhesive sheet 90 is applied to the inside surface of each disk substrate 2 by means of a rubber roller. Then a pair of disk substrates are joined by abutting the self-adhesive sheets and pressing the assembly under a pressure of about 1 to 5 kg/cm$^2$.

If one of the disk substrates 2 is deformed so that its inside or bonding surface has irregularities, the other disk substrate 2 would be deformed in accordance with the irregularities when the two disk substrates are in pressure joint. Then the completed disk will be low in mechanical precision and experience considerable runout during rotation.

In this regard, it is preferred to use a foam body having a compression hardness of up to 10 kgf/cm$^2$ as the base 91 of at least one self-adhesive sheet 90. Use of such foam base 91 can accommodate for irregularities on the inside or bonding surface of one disk substrate because only the base 91 of the self-adhesive sheet 90 is deformed in accordance with the irregularities and the other disk substrate remains intact. Then the optical disk is completed to a high mechanical precision close to the surface precision associated with the working surfaces of a press machine.

A foam body having a compression hardness of more than 10 kgf/cm$^2$ is less effective in accommodating for irregularities. Too low compression hardness is unacceptable for the base's own function. Therefore, the foam base 91 preferably has a compression hardness of 0.1 to 10 kgf/cm², especially from 0.1 to 5 kgf/cm².

Compression hardness is measured by the polyethylene foam test method prescribed in JIS K-6767. More particularly, a test piece having a length l of 5.0 cm, a width w of 5.0 cm, and a thickness h of about 2.5 cm is formed from the same material as the base 91. Using a compression hardness testing machine, the test piece is compressed by 25% of the initial thickness h and the load P (kgf) after 20 seconds is measured. Then compression hardness H is calculated by the equation:

H=P/wl

Insofar as a foam base has a compression hardness of up to 10 kgf/cm², no other limit is imposed on the base 91. A plastic foam body is preferred because it is depressed at locations corresponding to projections on the opposing disk substrate upon pressing, and maintains such depressed state after pressing, resulting in minimal deformation of the disk.

Examples of the plastic foam include expanded polyvinyl chloride, expanded polyolefins, expanded polyethylene, expanded polypropylene, expanded ethylene-vinyl acetate copolymers (EVA), expanded polystyrene, expanded polyurethane, expanded ABS, expanded polyvinyl alcohol (PVA), expanded cellulose acetate, acrylic foam, expanded epoxy resins, expanded phenolic resins, expanded urea resins, and silicone foam. Among others, expanded polyethylene, expanded polyurethane, expanded EVA, and expanded polystyrene are preferred in view of sheet formation and mechanical properties including compression hardness.

Often, the plastic foam has a density of 10 to 100 kg/m³. The plastic foam base 91 preferably has a thickness of about 50 to 500 μm, more preferably about 100 to 400 μm. Thinner bases are less effective for accommodating for irregularities whereas thicker bases increase the total thickness of the disk.

Figure 5:
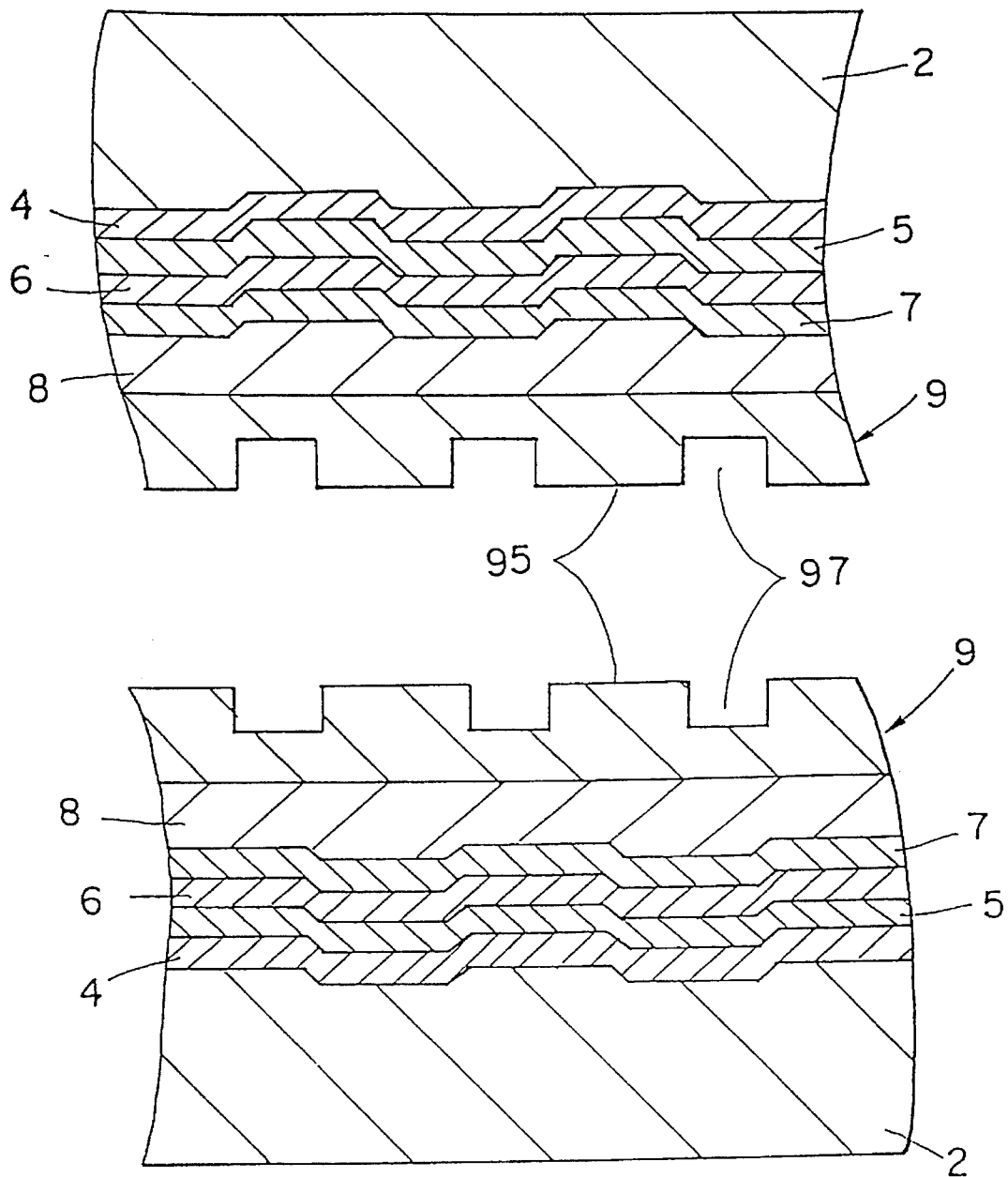
FIG. 5 is a fragmentary cross section of the optical disk of FIG. 4, showing a pair of disk substrates prior to joining.

Referring to FIGS. 4 and 5, there is illustrated a second embodiment in which a pair of disk substrates are joined through self-adhesive layers 9.

More particularly, self-adhesive layers 9 are spread substantially entirely over the inside surfaces of the respective disk substrates 2, 2. As shown in FIG. 5, either one or both of the self-adhesive layers 9, 9 on the respective disk substrates 9, 9 are formed with channels 97 as in the first embodiment. The pair of disk substrates 2, 2 are joined by abutting the self-adhesive layers 9, 9 together. Then communication passages 93 are left within the integrated self-adhesive layer 9 as shown in FIG. 4.

In the second embodiment, the channels 97 in the self-adhesive layer 9 should not reach the underlying protective coat 8 because otherwise, corrosion resistance and durability are somewhat lost and errors would occur during recording and reproduction when the disk is operated in high temperature/high humidity conditions or stored for a long time.

The channels 97 are formed by a single step of applying a self-adhesive composition through a nozzle of a special shape or by two steps of applying a self-adhesive composition by means of a rubber roll and further applying a self-adhesive composition locally thereon through a nozzle or locally depressing the self-adhesive layer. A self-supporting self-adhesive sheet (without a base or support) is acceptable.

In the second embodiment, the shape, pattern, dimension, and pitch of channels 97 and passages 93 are the same as in the first embodiment, that is, vary over a wide range.

Also contemplated herein is an embodiment in which a self-adhesive sheet 90 having a self-adhesive layer 9 and a second self-adhesive layer 99 on opposite surfaces of a base 91 is applied to the inside surface of one disk substrate 2 (as in FIG. 3) and a self-adhesive layer 9 is directly applied to the inside surface of the other disk substrate 2 (as in FIG. 5), and these disk substrates 2, 2 are integrally joined. In this embodiment, channels 97 are formed in the self-adhesive layer 9 on the inside surface of at least one of the paired disk substrates 2, 2.

Although the optical disk of the present invention is described as being applied to the double side recording type magneto-optic recording disk, the invention is also applicable to the single side recording type magneto-optic recording disk. Such a single side recording type magneto-optic recording disk is manufactured by mating a disk substrate having necessary layers stacked as described above (which may be the same as one of the disk substrates 2, 2 shown in FIG. 3 or 5) and a protective substrate such that the recording layer as the information carrying means is internally enclosed, and joining the substrates through a self-adhesive layer. Since the protective substrate has no information carrying means thereon, the self-adhesive layer 9 or second self-adhesive layer 99 need not be applied to the entire inside surface of the protective substrate.

In this way, there are obtained single and double side recording type magneto-optic recording disks which are improved in corrosion resistance, durability and mechanical precision.

Also the present invention is applicable to read-only optical disks such as optical video disks having information carrying means. The same benefits as described above are obtained in such applications.

It is to be understood that the information carrying means used herein encompasses both recording layers having information previously borne therein as found in read-only disks and recording layers in which information can be carried as found in recording/reproducing disks.

Now the second form of the present invention is described.

Figure 8:
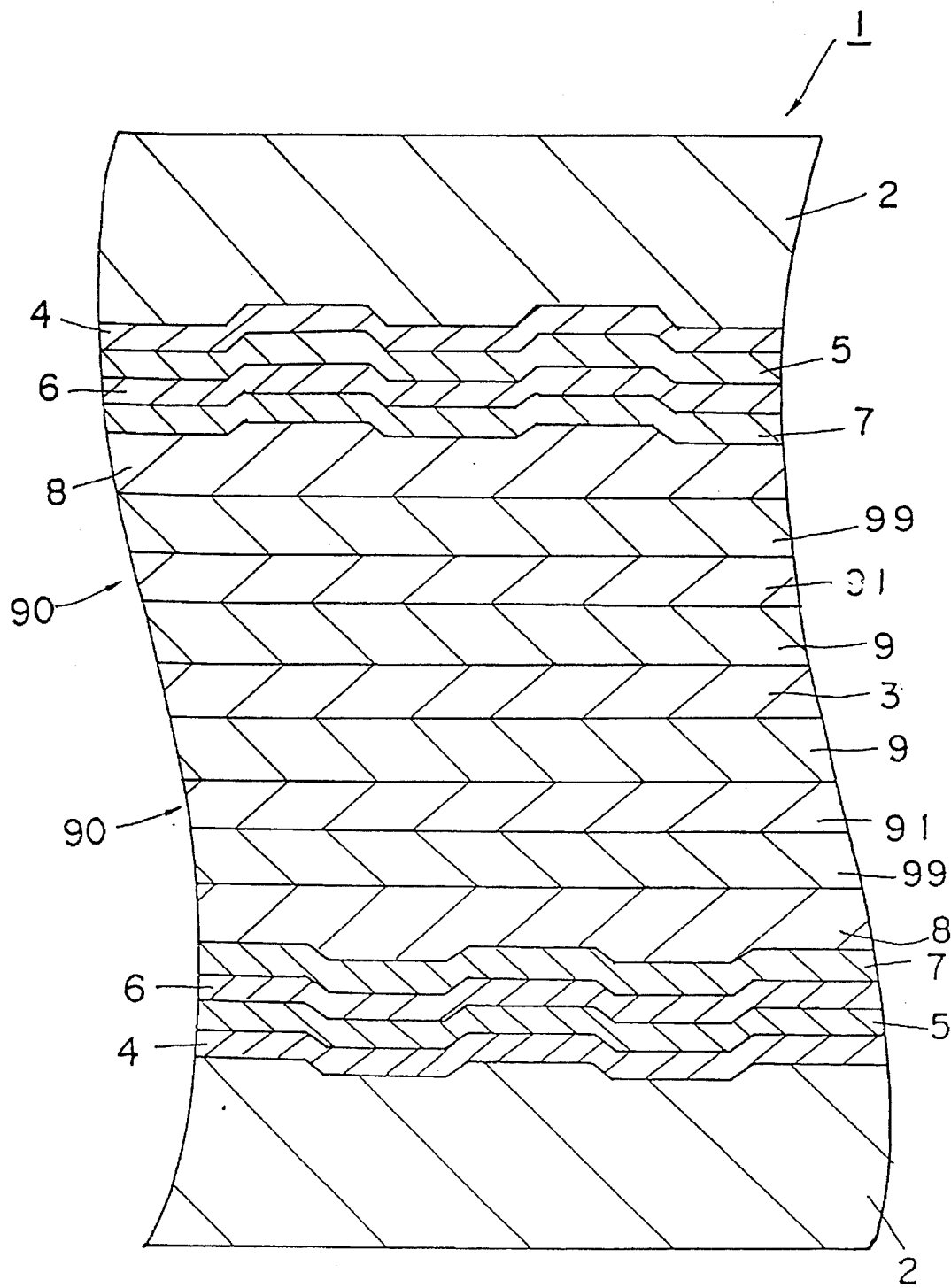
FIG. 8 is a fragmentary cross section of an optical disk according to a still further embodiment of the invention.

Referring to FIG. 8, there is illustrated a double side recording type magneto-optic recording disk generally designated at 1 as a representative preferred embodiment of the optical disk according to the present invention. The magneto-optic recording disk 1 is shown as including a pair of disk substrates 2 and 2 each having inside and outside major surfaces and inner and outer circumferential edges (not shown in FIG. 8, see FIGS. 6 and 7). On the inside surface of each disk substrate 2, a protective layer 4, an intermediate layer 5, a recording layer 6 as information carrying means, a protective layer 7, and a protective coat 8 are provided in the described order. The pair of disk substrates 2 and 2 are mated such that their inside surfaces face each other and joined via adhesive layers 9, 9 and a buffer foam sheet 3 to form an integral disk. The term "inside surface" used herein refers to the inside surface of a disk substrate, but mostly to the surface of the uppermost layer on the disk substrate because some necessary layers have been formed on each disk substrate before the substrates are integrally joined.

The disk substrates 2 are transparent to recording and reproducing light. They are generally formed of resins though they may be of glass if desired. The disk substrates 2 are of disk-shape or annulus, generally having an outer diameter of about 50 to about 360 mm and an inner diameter of about 15 to about 35 mm. Any type of resin may be used, but acrylic resins, polycarbonate, epoxy resins, and polyolefins are preferred. The disk substrates may be formed from such resins by well-known methods. Typically, resin compounds are injection molded into disk substrates in which pits and grooves are concurrently formed in a predetermined pattern for tracking and addressing purposes. Alternatively, disk substrates are first molded and a resin layer having a predetermined pattern of grooves is then formed thereon by 2 P method or the like.

On the disk substrate 2 is formed the intermediate layer 5 which is effective for improving C/N ratio. The intermediate layer 5 may be formed of various dielectric materials, preferably to a thickness of about 30 to about 150 nm. In addition to the intermediate layer 5, a similar dielectric material may be formed as the protective layer 7 on the recording layer 6.

Optional are the protective layers 4 and 7 which are effective for improving the corrosion resistance of the recording layer 6. Preferably either one, most preferably both of the protective layers 4 and 7 are provided. They may be inorganic thin films formed of various oxides, carbides, nitrides, sulfides or mixtures thereof or glass. The protective layer is about 30 to about 300 nm thick for corrosion resistance improvement.

Preferably, the protective layers 4 and 7 as well as the intermediate layer 5 are formed by various gas phase film forming techniques, typically sputtering.

The recording layer 6 is adapted to allow information to be recorded magnetically using a modulated thermal beam or modulated magnetic field and the recorded information to be reproduced through magneto-optic conversion. The recording layer 6 may be formed of any desired material insofar as magneto-optic recording is possible. Generally, alloys containing rare earth metals, especially rare earth metal-transition metal alloys are applied by sputtering, evaporation, ion plating or the like, to thereby form amorphous films. The recording layer 6 is usually about 10 to about 500 nm thick.

On the recording layer 6 is provided the protective coat 8 which is effective for improving corrosion resistance and mar resistance. It is preferably formed of various organic materials, more preferably radiation-curable compounds which are cured with electron radiation or UV light. When it is of radiation-cured compounds, The protective coat 8 is generally of about 0.1 to about 100 μm thick and formed by well-known methods such as spin coating, gravure coating, spraying and dipping.

The pair of disk substrates 2 and 2 each having the above-mentioned stack of layers are mated such that their inside surfaces face each other and accordingly, the recording layers 6 are internally enclosed. Particularly, the disk substrates 2 and 2 are joined via the adhesive layers 9 and buffer foam sheet 3 to form an integral disk.

In one embodiment of the invention, a self-adhesive sheet 90 is additionally used in joining a pair of disk substrates 2 and 2 as shown in FIG. 8. The use of self-adhesive layer allows the joint operation to be performed in a clean room. Joinder can be completed briefly and simply by pressing under a pressure of about 1 to 5 kg/cm². Therefore, the joint operation is easy and complete within a short time. The risk of corrosion of the recording layer 6 is eliminated because the self-adhesive composition is free of a curing agent or sensitizer.

Figure 9:
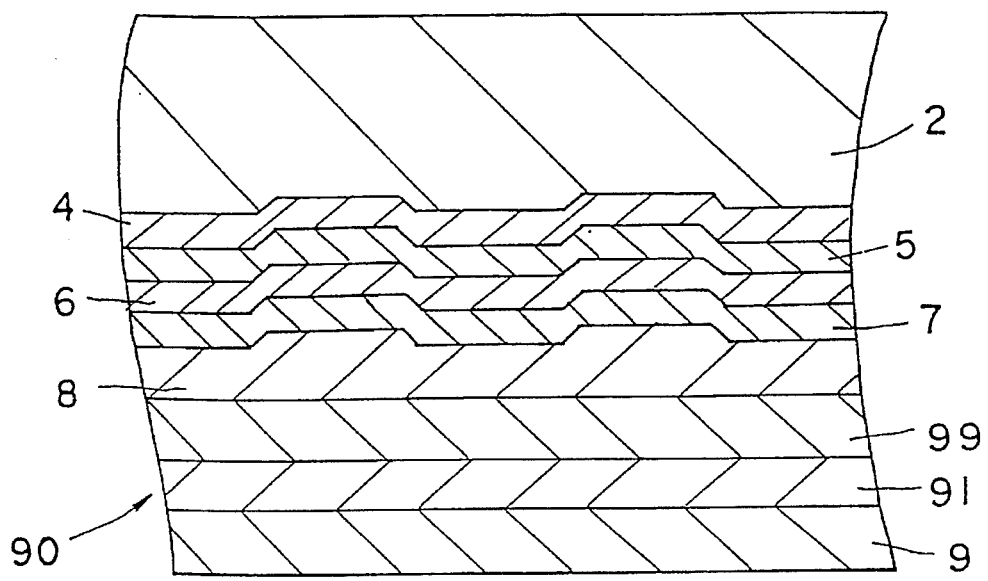
FIGS. 9, 10, 11, and 12 are exploded fragmentary cross sections of the optical disk of FIG. 8 prior to mating.
Figure 9:
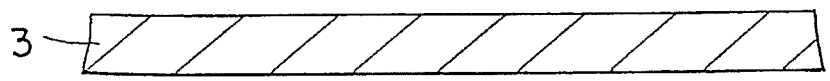
Figure 9:
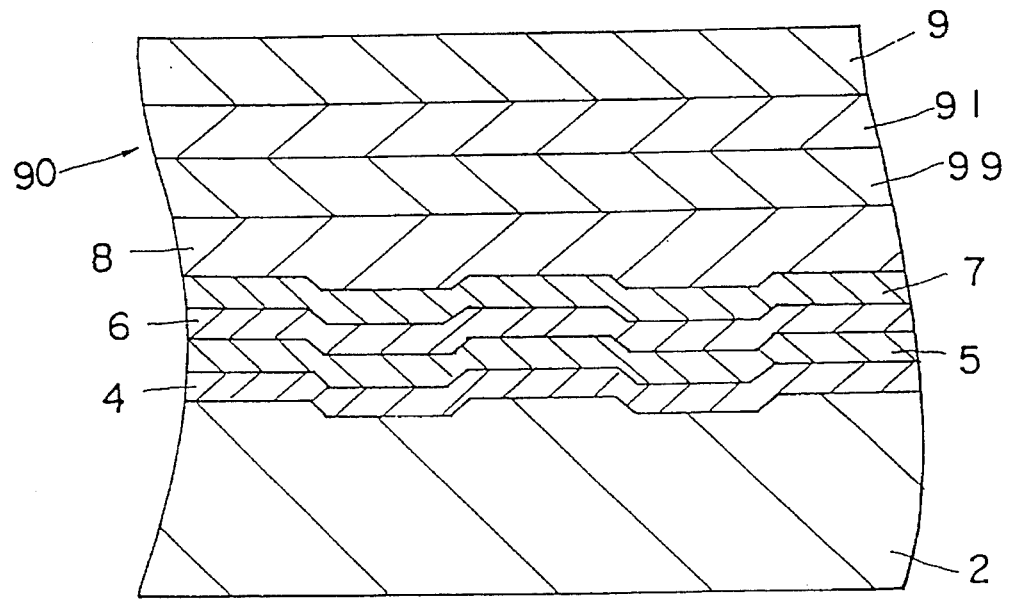

The self-adhesive sheet 90 is shown in FIG. 9 as including a base 91 with first and second major surfaces having the adhesive layer 9 on the first major surface and a second adhesive layer 99 on the second major surface, both the adhesive layers formed of a pressure-sensitive adhesive or self-adhesive composition. More particularly, the self-adhesive sheet 90 has a pair of adhesive layers on opposite major surfaces of the base 91, that is, the adhesive layer 9 for bonding the paired disk substrates together and the second adhesive layer 99 for bonding the self-adhesive sheet 90 to a corresponding disk substrate. If desired, a primer layer may be interposed between the base 91 and the adhesive layer 9 or 99.

The self-adhesive sheet 90 is of generally disk shape and of dimensions which may be properly selected in accordance with the dimensions of the disk substrates 2.

No particular limit is imposed on the materials of which the adhesive layers 9 and 99, base 91, and optional primer layer are made. Use may be made of the materials commonly used in conventional self-adhesive sheets and self-adhesive compositions. For example, the adhesive layers 9 and 99 may be formed of rubber, acryl, silicone, and polyvinyl ether base self-adhesive compositions. These self-adhesive compositions are conventionally composed of a base polymer, tackifier, softener, filler, anti-oxidant, crosslinking agent and other additives. Preferably, the self-adhesive composition used has a specific gravity of about 1.0 to 1.3 and the adhesive layers 9 and 99 have a thickness of about 10 to 200 μm before pressing and a thickness of about 10 to 100 μm after pressing.

For the base 91, various resins may be used, for example, polypropylene, polyvinyl chloride, polyethylene terephthalate, polyimide, cellulose, acetate, tetrafluoroethylene, and epoxy resins. The base 91 is generally about 10 to 50 μm thick.

The primer layer may be formed of MMA-grafted natural rubber, isocyanate blends, chlorinated polypropylene, etc. and have a thickness of about 1 to 100 μm.

The magneto-optic disk of the invention is prepared by furnishing a pair of self-adhesive sheets 90 and 90 each having the adhesive layers 9 and 99. As shown in FIG. 9, each self-adhesive sheet 90 is attached to the inside surface of one disk substrate 2, more particularly to the protective coat 8, via the second adhesive layer 99. It is the second adhesive layer 99 that is bonded to the protective coat 8 and the layer 99 covers substantially the entire area of the protective coat 8.

Next, the pair of disk substrates 2 and 2 are mated by joining together the adhesive layers 9 and 9 of the respective self-adhesive sheets 90 and 90 previously secured to the respective disk substrates 2 and 2 through the damping or buffer foam sheet 3.

Use of the buffer foam sheet 3 can accommodate for irregularities on the inside or bonding surface of one disk substrate because only the side of the sheet 3 facing the one disk substrate is deformed or depressed in accordance with the irregularities and the other disk substrate remains intact. Then the optical disk is completed to a high mechanical precision close to the surface precision associated with the working surfaces of a press machine.

The damping or buffer sheet 3 preferably has a compression hardness of up to 10 kgf/cm². A buffer sheet having a compression hardness of more than 10 kgf/cm² is less effective in accommodating for irregularities. Too low compression hardness is unacceptable for the damping purpose. Therefore, the buffer sheet 3 preferably has a compression hardness of 0.1 to 10 kgf/cm², especially from 0.1 to 5 kgf/cm².

Compression hardness is measured by the polyethylene foam test method prescribed in JIS K-6767. More particularly, a test piece having a length l of 5.0 cm, a width w of 5.0 cm, and a thickness h of about 2.5 cm is formed from the same material as the buffer sheet 3. Using a compression hardness testing machine, the test piece is compressed by 25% of the initial thickness h and the load P (kgf) after 20 seconds is measured. Then compression hardness H is calculated by the equation:

$$H = P/wl$$

Insofar as the buffer sheet 3 is a foam, no other limit is imposed thereon. A plastic foam sheet is preferred because it is depressed at locations corresponding to projections on the opposing disk substrate upon pressing, and maintains such depressed state after pressing, resulting in minimal deformation of the disk.

Examples of the plastic foam include expanded polyvinyl chloride, expanded polyolefins, expanded polyethylene, expanded polypropylene, expanded ethylene-vinyl acetate copolymers (EVA), expanded polystyrene, expanded polyurethane, expanded ABS, expanded polyvinyl alcohol (PVA), expanded cellulose acetate, acrylic foam, expanded epoxy resins, expanded phenolic resins, expanded urea resins, and silicone foam. Among others, expanded polyethylene, expanded polyurethane, expanded EVA, and expanded polystyrene are preferred in view of sheet formation and mechanical properties including compression hardness.

Often, the plastic foam has a density of 20 to 100 kg/m$^3$. The plastic foam sheet 3 preferably has a thickness of about 50 to 500 μm, more preferably about 100 to 400 μm. Thinner sheets are less effective for accommodating for irregularities whereas thicker sheets increase the total thickness of the disk.

A pair of disk substrates 2, 2 are integrated, for example, by applying a self-adhesive sheet 90 to the inside surface of each disk substrate 2 by means of a rubber roller, abutting the self-adhesive sheets 90 through the buffer sheet 3 to mate the disk substrates together, and pressing the assembly under a pressure of about 1 to 5 kg/cm$^2$.

Figure 10:
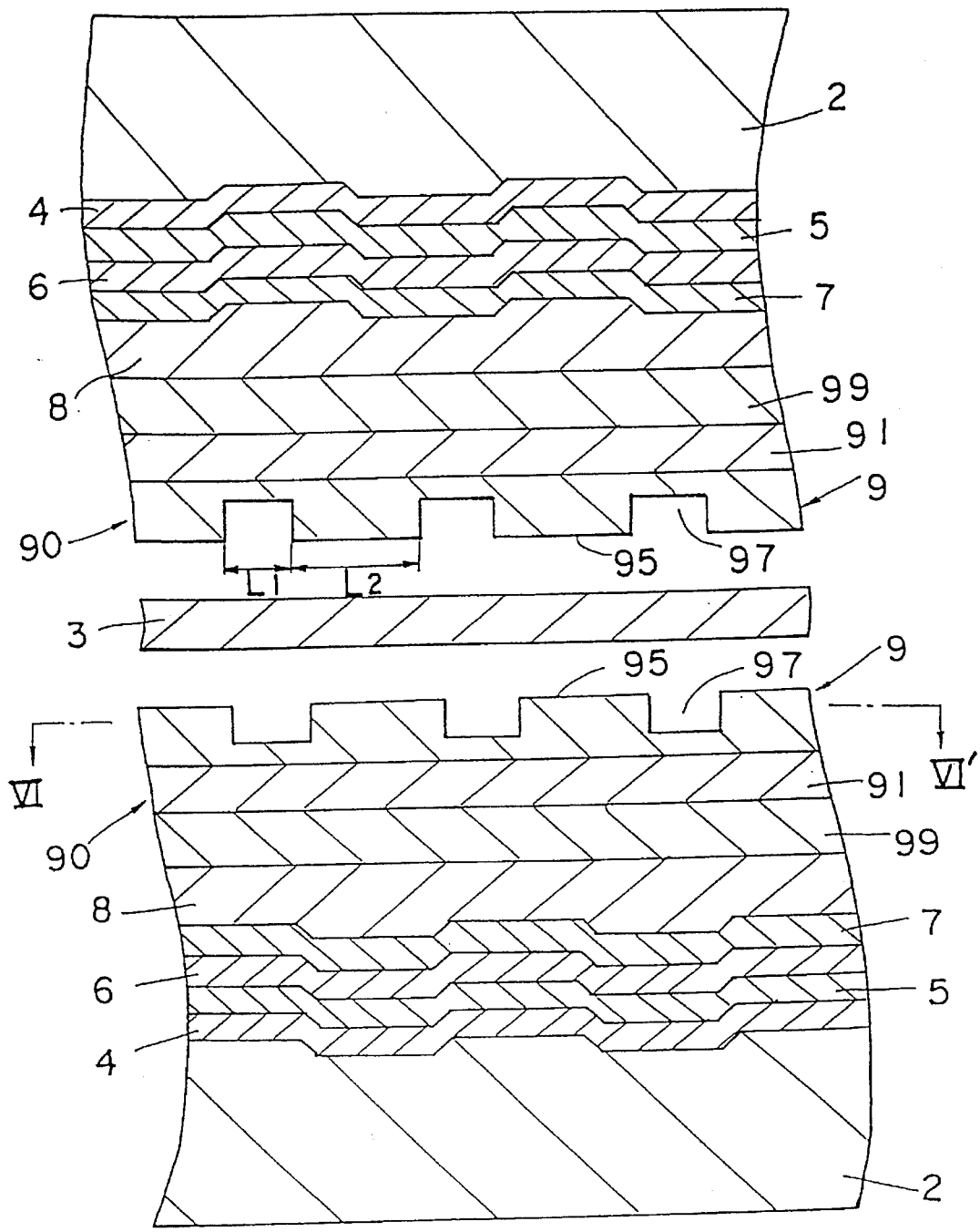

In a preferred embodiment of the invention, as shown in FIG. 10, the adhesive layer 9 of each self-adhesive sheet 90 serving to joining a pair of disk substrates is formed on at least its surface with a plurality of channels 97 which extend from the outer and/or inner circumferential edge to the outer and/or inner circumferential edge over the sheet surface facing the internal region of the disk. In some cases, the channels 97 vertically extend throughout the adhesive layer 9 as viewed in FIG. 10 and reach the base 91 so that the self-adhesive layer 9 may be divided into segments. It is to be noted that no channels are formed on the second adhesive layer 99 serving to joining the self-adhesive sheet 90 to the disk substrate.

In FIG. 10, lands 95 are left in the adhesive layer 9 between the two adjoining channels 97. Often the lands 95 occupy at least 30% of the surface area of the adhesive layer 9. Less than 30% by area of lands 95 provide insufficient bond strength. The removal of air bubble becomes incomplete if the lands 95 occupy nearly 100% by area. Therefore, the lands 95 more preferably occupy 30 to 95%, most preferably 50 to 90% of the surface area of the self-adhesive layer 9. The proportion of lands 95 is also defined as the area of lands 95 divided by the area of lands 95 and channels 97 as projected in a thickness direction of the disk substrate 2.

No particular limit is imposed on the shape and pattern of channels 97 formed in adhesive layer 9. Illustrated in FIG. 10 are linear channels 97 of rectangular cross-section formed at a predetermined pitch in parallel arrangement. It is to be noted that the cross-sectional shape of channels 97 after pressurization is somewhat deformed from that before pressurization.

Illustrated in FIG. 6 is a cross section of the channeled adhesive layer 9 taken along lines VI—VI' in FIG. 10. The channels 97 are seen to extend straight from the outer circumferential edge to the outer circumferential edge, with some from the inner circumferential edge to the outer circumferential edge. These linear channels 97 are desirable in that the adhesive layer 9 is easy to form and efficient air escape is ensured. The parallel arrangement of channels 97 makes it easy to control the proportion of lands 95 and the pitch of channels 97.

In the embodiment illustrated in FIGS. 6 and 10, the proportion of lands 95 in adhesive layer 9 is expressed by L2/(L1+L2) wherein L1 is the width of each channel 97 and L2 is the width of each land 95. As defined above, L2/(L1+L2) is preferably at least 0.3, more preferably from 0.3 to 0.95, most preferably from 0.5 to 0.9.

Preferably, channels 97 are formed at a population of at least one channel per cm. Differently stated, channels are formed at a pitch of up to 1 cm. With a larger pitch, more air bubbles would be entrained if the proportion of lands 95 is high, and the mechanical precision of the disk would be adversely affected if the proportion of lands 95 is low. The preferred pitch ranges from 0.01 to 1 cm, especially from 0.05 to 0.2 cm since it is difficult to form channels 97 at too smaller pitches. With relatively larger pitches within this range, the proportion of lands 95 is increased to prevent a lowering of mechanical precision of the disk. For example, for a pitch of about 0.1 to 1 cm, the proportion of lands 95 should preferably be at least 0.5, more preferably from 0.5 to 0.95. Most often, channels 97 are formed at a constant pitch although varying pitches are acceptable.

The depth of channels 97 is usually at least about 10% of the thickness of self-adhesive layer 9.

In the embodiment shown in FIG. 10, a pair of self-adhesive sheets 90, 90 have respective self-adhesive layers 9, 9 which are formed with channels 97 in the same pattern. A pair of disk substrates 2, 2 are joined such that the channels on one side intersect the channels on the other side at an angle of about 90°. In another embodiment, a pair of disk substrates 2, 2 may be joined such that the channels on one side coincide with the channels on the other side, that is, an intersection angle of 0°. Preferred for the purpose of achieving higher mechanical precision for the disk is the former embodiment in which a pair of disk substrates 2, 2 are joined such that the channels 97 on one self-adhesive sheet 90 intersect the channels 97 on the other self-adhesive sheet 90 at a certain angle, typically of about 45° to 90°.

Another pattern of channels 97 in the adhesive layer 9 is illustrated in FIG. 7.- FIG. 7 is a cross section of the channeled self-adhesive layer 9 similar to FIG. 6. The channels 97 are seen to extend radially from the inner circumferential edge to the outer circumferential edge. As in the former embodiment, the channels 97 are preferably linear and at a constant pitch. The channels 97 are formed at a population of at least one channel per cm, more preferably 1 to 100 channels per cm, most preferably 5 to 20 channels per cm as measured along the outer circumferential edge of the disk substrate. The proportion of lands 95 may be directly determined from the projected areas of lands and channels, but can be expressed in approximate form by an average of L2/(L1+L2) at the outer circumferential edge and L2/(L1+L2) at the inner circumferential edge.

Like the former embodiment, the radial arrangement of channels 97 also has the advantages of easy control of the channel pitch and land proportion, preventing air bubble entrainment.

It is also possible that the adhesive layer 9 be provided with lands 95 in discrete island form. Preferably, the proportion of lands 95 is from 0.3 to 0.9, more preferably 0.5 to 0.8. Preferably, discrete land segments each have a surface area of 1 to 1000 mm$^2$, more preferably 10 to 500 mm$^2$, and are present in a population of 0.03 to 95 segments/cm$^2$, more preferably about 0.25 to 9 segments/cm$^2$. With a smaller population of discrete land segments per unit area, for example, of the order of 0.03 to 1 segment/cm$^2$, the proportion of lands 95 in the self-adhesive layer 9 should preferably be 0.5 to 0.95, more preferably 0.7 to 0.9.

The shape and pattern of channels 97 in adhesive layer 9 are not limited to the illustrated embodiments. For example, the channels 97 may have a cross-sectional shape of trapezoid, triangle, and semi-circle and the pattern may be curvilinear, polygonal or the like. The channels may be either parallel or non-parallel and can intersect with each other.

Also, the shape and pattern of channels 97 in self-adhesive layers 9, 9 of paired self-adhesive sheets 90, 90 may be the same or different although the identical channels are advantageous for ease of formation. As previously mentioned, the channels on one side are at a certain angle to the channels on the other side when a pair of disk substrates are mated.

Gravure printing or other conventional techniques are used in forming the adhesive layer 9. The adhesive layer 9 can be channeled or patterned in various ways. One common approach is to apply a adhesive composition to the entire surface of a base and to form channels in the adhesive layer. It is convenient to use a base having a desired pattern of channels preformed therein. Then by applying an adhesive composition to the patterned base, there is obtained an adhesive layer in which channels are already defined in conformity to the pattern of the base. The flat surface second adhesive layer 99 as well as flat adhesive layer 9 may be applied by conventional techniques used in the manufacture of self-adhesive sheets.

Figure 11:
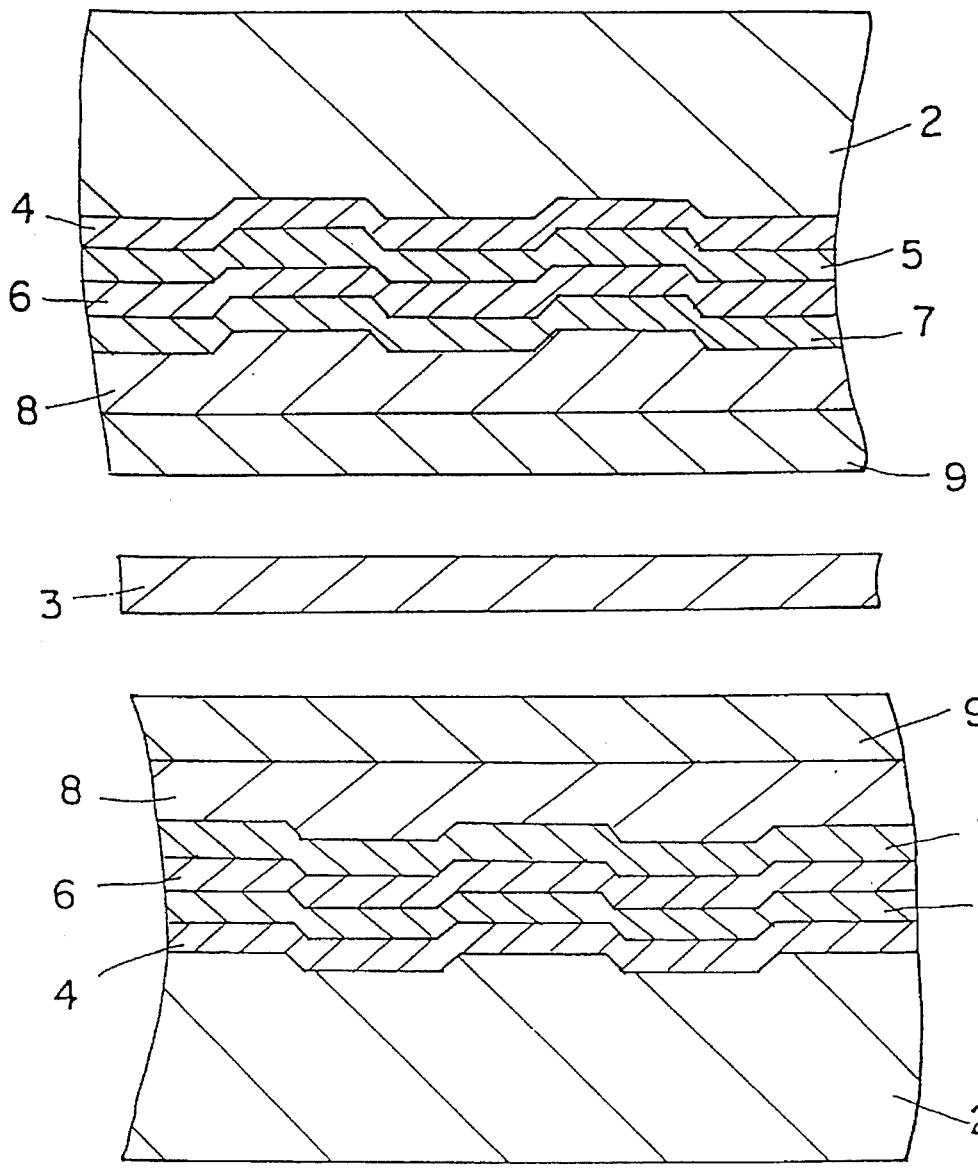

FIG. 11 shows a second embodiment of the optical disk according to the second form of the invention. A pair of disk substrates 2, 2 are joined and integrated by applying an adhesive layer 9 to the inside surface of each disk substrate substantially over its entire area, and bonding the adhesive layers 9 through a buffer foam sheet 3 as mentioned above.

The adhesive layer 9 may be formed from a self-adhesive composition or a hot-melt adhesive composition. Preferred among these is the self-adhesive composition because it is compatible with clean room conditions, easy to apply, and short to complete a bond.

The hot-melt adhesive compositions are conventionally composed of a base polymer, tackifier, softener, plasticizer, wax and other additives. The base polymers used herein include polyolefin resins, such as polyethylene, polypropylene, polystyrene, copolymers containing such units, mixtures thereof, and mixtures thereof with other polyolefins, polyolefin copolymers, and synthetic rubbers.

Figure 12:
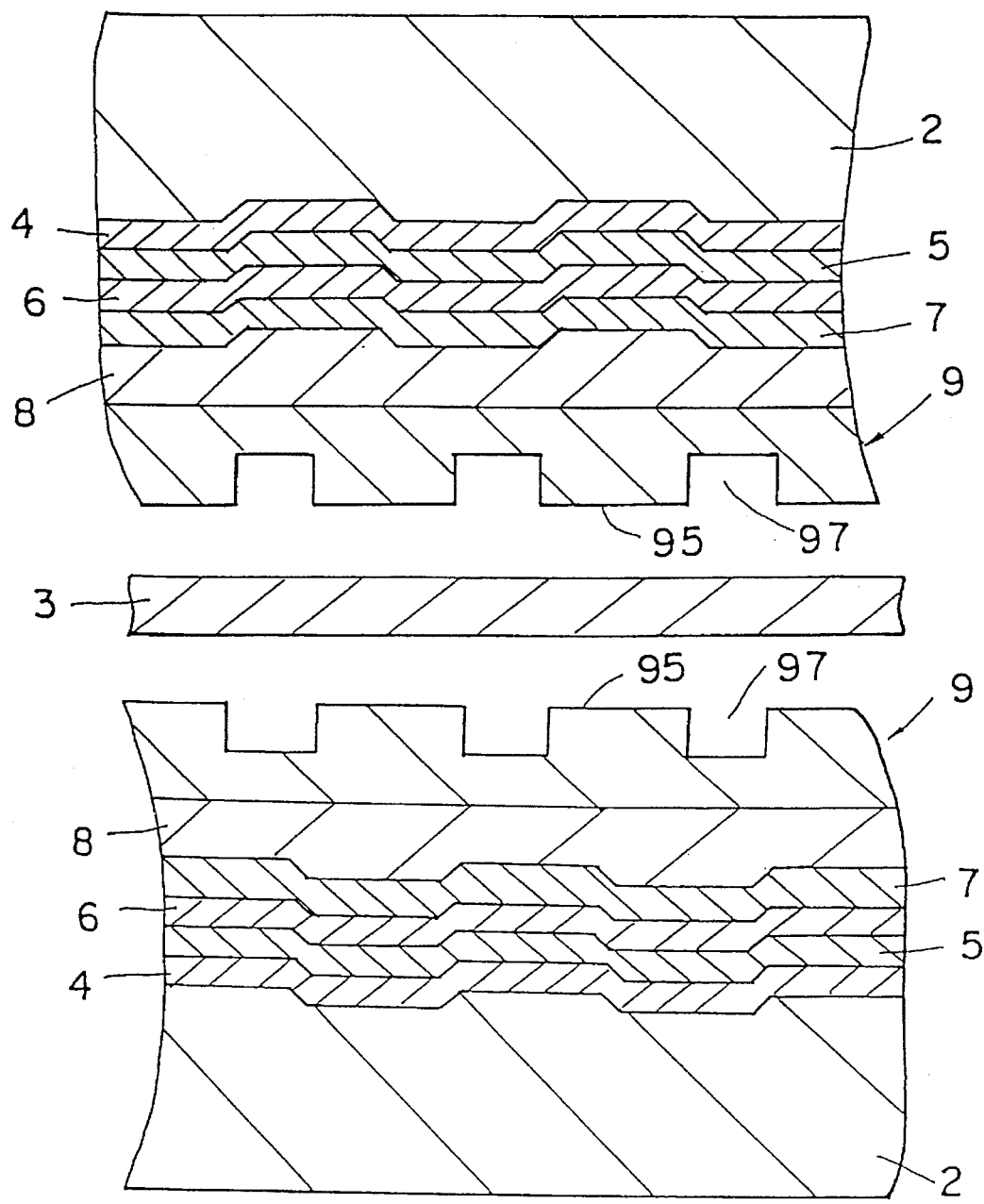

Also in the second embodiment, as shown in FIG. 12, the adhesive layer 9 on each of the disk substrates 2 is provided on the surface with a plurality of channels 97 as in the former embodiment.

In the second embodiment, the channels 97 in the adhesive layer 9 should not reach the underlying protective coat 8 because otherwise, corrosion resistance and durability are somewhat lost and errors would occur during recording and reproduction when the disk is operated in high temperature/high humidity conditions or stored for a long time.

In the case of forming the channels 97 in the adhesive layer 9, it is preferred to use a self-adhesive composition because of easy formation of channels and lands of desired shape and dimensions, that is, easy control of L1 and L2, leading to increased bond strength.

The channels 97 may be formed by a single step of applying an adhesive composition through a nozzle of a special shape or by two steps of applying an adhesive composition by means of a rubber roll and further applying an adhesive composition locally thereon through a nozzle or locally depressing the adhesive layer. A self-supporting adhesive sheet (without a base or support) is acceptable.

In the second embodiment, the shape, pattern, dimension, and pitch of channels 97 are the same as in the first embodiment, that is, vary over a wide range.

Also contemplated herein is an embodiment in which an adhesive sheet 90 having an adhesive layer 9 and a second adhesive layer 99 on opposite surfaces of a base 91 is applied to the inside surface of one disk substrate 2 (as in FIG. 9 or 10) and an adhesive layer 9 is directly applied to the inside surface of the other disk substrate 2 (as in FIG. 11 or 12), and these disk substrates 2, 2 are integrally joined via the buffer foam sheet 3.

Although the foregoing description is illustrative of the double side recording type magneto-optic recording disk, the invention is also applicable to the single side recording type magneto-optic recording disk. Such a single side recording type magneto-optic recording disk is manufactured by mating a disk substrate having necessary layers stacked as described above (which may be the same as one of the disk substrates 2, 2 shown in FIGS. 9, 10, 11 or 12) and a protective substrate such that the recording layer as the information carrying means is internally enclosed, and joining the substrates through an adhesive layer and a buffer member. Since the protective substrate has no information carrying means thereon, the adhesive layer 9 or second adhesive layer 99 need not be applied to the entire inside surface of the protective substrate.

In this way, there are obtained single and double side recording type magneto-optic recording disks which are improved in corrosion resistance, durability and mechanical precision.

Also the present invention is applicable to read-only optical disks such as optical video disks having information carrying means. The same benefits as described above are obtained in such applications.

It is to be understood that the information carrying means used herein encompasses both recording layers having information previously borne therein as found in read-only disks and recording layers in which information can be carried as found in recording/reproducing disks.

EXAMPLE

Examples of the present invention are given below by way of illustration and not by way of limitation.

Examples 1 and 2 are illustrative of the first form of the invention.

EXAMPLE 1

A self-adhesive sheet A as shown at 90 in FIG. 2 was prepared by furnishing a disk-shaped base (91) of polyethylene terephthalate having a thickness of 50 µm, applying a channeled self-adhesive layer (9) to one surface, and applying a flat second self-adhesive layer (99) to the other surface. The self-adhesive layer (9) had linear parallel channels (97) of rectangular cross section formed therein. For the self-adhesive layers, an acrylic adhesive composition comprising alkyl acrylate as a base polymer was used. It had a shear strength of 10 kg/cm$^2$ in PC/PC as measured by the shear strength test prescribed in JIS K-6850 and a holding force evaluated as 2-hour retention in the creep test of applying a load of 200 grams to an area of 2 cm×2 cm at a temperature of 60° C. The self-adhesive layers (9 and 97) each were 20 μm thick. The channels (97) in the self-adhesive layer (9) had a depth of 10 μm, a width L1 of 0.07 cm, and a pitch L1+L2 of 0.17 cm.

Additionally prepared were a self-adhesive sheet B having flat adhesive layers of 20 μm thick on opposite surfaces of a base and a self-adhesive sheet C having channeled adhesive layers of 20 μm thick on opposite surfaces of a base. Sheet C had linear channels of rectangular cross section formed in both the adhesive layers to a depth of 10 μm, a width L1 of 0.07 cm, and a pitch L1+L2 of 0.17 cm.

For self-adhesive sheets A, B, and C, the proportion L2/(L1+L2) of lands in the self-adhesive layer and the number of channels per cm are shown in Table 1.

Next, as shown in FIG. 3, on each of disk substrates which were formed by injection molding polycarbonate so that grooves are formed at the same time, there were sequentially stacked a protective layer (4) of glass, an intermediate layer (5) of SiNx, a recording layer (6) of TbFeCo, a protective layer (7) of SiNx, and a protective coat (8) of UV-curable resin. The polycarbonate disk substrates were of disk shape having an outer diameter of 130 mm, an inner diameter of 15 mm, and a thickness of 1.2 mm. All the overlying layers were formed by sputtering.

Self-adhesive sheet A was attached to each of the paired disk substrates by bringing the flat second self-adhesive layer in contact with the protective coat as shown in FIG. 3. The pair of disk substrates were mated such that the respective self-adhesive layers joined together and the channels in one self-adhesive layer were at an angle of about 90° relative to the channels in the other self-adhesive layer. In this way, the pair of disk substrates were joined, obtaining a double side recording type magneto-optic recording disk sample No. 1 as shown in FIG. 1.

Similarly, comparative disk sample No. 2 was prepared by joining a pair of disk substrates at their inside surfaces through a single self-adhesive sheet B. Comparative disk sample No. 3 was prepared by joining a pair of disk substrates at their inside surfaces through a single self-adhesive sheet C.

A pressure of 1 kg/cm² was applied for the assembly of the respective samples. After pressing, the thickness of the self-adhesive layers and the shape and dimensions of channels remained approximately unchanged from the initial.

In comparative sample No. 2, air bubbles of about 1 to 2 cm in diameter were found between the substrate and the adhesive layer. In inventive sample No. 1 and comparative sample No. 3 both using a-channeled self-adhesive sheet, no air bubbles were found.

These samples were evaluated by the following test.

(1) Instantaneous runout acceleration

Using a mechanical precision tester ODA 02 (manufactured by Shin-Denshi Kogyo K. K.), the disk was measured for runout acceleration at intervals of 1 mm over an annular region of radially extending from 30 to 60 mm from the disk center while rotating the disk at 1,800 rpm.

Three samples were used for each magneto-optic recording disk and an average of maximum runout accelerations was determined.

The runout acceleration is expressed by the acceleration of an optical pickup during focusing servo, representing the degree of flatness of the disk substrate having tracking grooves formed therein. It is recommended according to the ISO standard that the runout acceleration be up to 20 m/s², especially up to 10 m/s² for magneto-optic recording disks having an outer diameter of 130 mm.

(2) Corrosion resistance

Magneto-optic signals were recorded in the disk using laser pulses at 2 MHz while rotating the disk at 1,800 rpm. Then the disk was stored in an environment at a temperature of 80° C. and a relative humidity of 80% for 2,000 hours.

The disk was reproduced at intervals of 500, 1,000, 1,500 and 2,000 hours, evaluating disk deterioration in terms of error rate and S/N ratio as compared with the recorded signals. Corrosion resistance was determined from the deterioration of signals at the respective storage times. Evaluation was made according to the following criterion.

Ex: no change from the initial after 2,000 hours

Good: slight increase in error rate after 2,000 hours

Fair: twice or more increase in error rate from the initial after 2,000 hours

Poor: error rate and S/N markedly deteriorated midway

The results are shown in Table 1.

TABLE 1

| Sample No. | 1 | 2* | 3* |
| --- | --- | --- | --- |
| Self-adhesive sheet | A | B | C |
| Proportion of lands | 0.6 | 1 | 0.6 |
| Number of channels (channels/cm) | 6 | — | 6 |
| Instantaneous runout acceleration (m/s²) | 8.03 | 17.78 | 7.60 |
| Corrosion resistance | Ex | Ex | Poor |

*comparative examples

The benefits of the present invention are evident from Table 1.

It is to be noted that sample No. 1 showed a fully high bond strength.

Equivalent results were obtained when magneto-optic recording disks were prepared by changing the shape, dimensions and pattern of channels, or by directly applying a channeled self-adhesive layer to the inside surface of each disk substrate whereby a pair of disk substrates were integrally joined by closely contacting the self-adhesive layers, and when read-only double side optical video disks were prepared.

EXAMPLE 2

A self-adhesive sheet D was prepared by the same procedure as self-adhesive sheet A used in sample No. 1 of Example 1 except that a base of expanded polyethylene having a thickness of 300 μm was used. The foam base had a compression hardness of 1.0 kgf/cm² as measured by the polyethylene foam test method prescribed in JIS K-6767.

Sample No. 4 was prepared by the same procedure as sample No. 1 of Example 1 using self-adhesive sheet D.

Sample No. 4 was evaluated as in Example 1, finding an instantaneous runout acceleration of 7.50 m/s². No signal deterioration as compared with the initial was found even after 2000-hour storage at 80° C./RH 80%. Bond strength was fully high.

Additionally, the following test was carried out on sample No. 4.

(3) Maximum runout

Using a mechanical precision tester ODA 02 (manufactured by Shin-Denshi Kogyo K. K.), the disk was measured for runout at intervals of 1 mm over an annular region of radially extending from 30 to 60 mm from the disk center while rotating the disk at 1,800 rpm.

Three samples were used for each magneto-optic recording disk and an average of maximum circumferential runouts was determined.

The runout is expressed by the travel of an optical pickup during focusing servo, representing the degree of flatness of the disk substrate having tracking grooves formed therein like the runout acceleration. It is recommended according to the ISO standard that the runout be up to ±300 µm for magneto-optic recording disks having an outer diameter of 130 mm, the smaller the better.

Sample No. 4 shows a maximum runout of 55 µm. In the same test, sample Nos. 1, 2, and 3 of Example 1 showed a maximum runout of 82 µm, 98 µm, and 114 µm, respectively.

These data demonstrate the effectiveness of the invention.

Examples 3 and 4 are illustrative of the second form of the invention.

EXAMPLE 3

A self-adhesive sheet E as shown at 90 in FIG. 9 was prepared by furnishing a disk-shaped base (91) of polyethylene terephthalate having a thickness of 50 µm, applying a flat adhesive layer (9) of 20 µm thick to one surface, and applying a flat second adhesive layer (99) of 20 µm thick to the other surface. For the adhesive layers, an acrylic pressure-sensitive adhesive composition comprising alkyl acrylate as a base polymer was used. It had a shear strength of 10 kg/cm² in PC/PC as measured by the shear strength test prescribed in JIS K-6850 and a holding force evaluated as 2-hour retention in the creep test of applying a load of 200 grams to an area of 2 cm×2 cm at a temperature of 60° C.

A buffer sheet 3 of disk shape was prepared from an expanded polyethylene strip of 300 µm thick. The foam strip had a compression hardness of 1.0 kgf/cm² as measured by the polyethylene foam test method prescribed in JIS K-6767 and a density of 30 kg/m³.

Next, as shown in FIG. 9, on each of disk substrates (2) which were formed by injection molding polycarbonate so that grooves are formed at the same time, there were sequentially stacked a protective layer (4) of glass, an intermediate layer (5) of SiNx, a recording layer (6) of TbFeCo, a protective layer (7) of SiNx, and a protective coat (8) of UV-curable resin. The polycarbonate disk substrates were of disk shape having an outer diameter of 130 mm, an inner diameter of 15 mm, and a thickness of 1.2 mm. All the overlying layers were formed by sputtering.

Self-adhesive sheet E was attached to each of the paired disk substrates by bringing the second self-adhesive layer in contact with the protective coat as shown in FIG. 9. The pair of disk substrates (2) were mated such that the respective self-adhesive layers (9) joined together through the damping foam sheet E (90). In this way, the pair of disk substrates were joined, obtaining a double side recording type magneto-optic recording disk sample No. 21 as shown in FIG. 8.

A pressure of 1 kg/cm² was applied for the assembly of the respective samples. After pressing, the thickness of the self-adhesive layers remained approximately unchanged from the initial.

A comparative sample No. 22 was prepared by the same procedure as above except that the damping foam sheet was omitted.

Using a mechanical precision tester ODA 02 (manufactured by Shin-Denshi Kogyo K. K.), the disk was measured for circumferential runout at intervals of 5 mm over an annular region of radially extending from 30 to 60 mm from the disk center while rotating the disk at 1,800 rpm. Three samples were used for each magneto-optic recording disk and an average of maximum circumferential runouts was determined. The runout is expressed by the travel of an optical pickup during focusing servo, representing the degree of flatness of the disk substrate having tracking grooves formed therein like the runout acceleration. It is recommended according to the ISO standard that the runout be up to ±300 µm for magneto-optic recording disks having an outer diameter of 130 mm, the smaller the better.

Sample No. 21 shows a maximum runout of 45 µm whereas comparative sample No. 22 showed a maximum runout of 98 µm.

Equivalent results were obtained when disk samples were prepared by applying an adhesive layer of a self-adhesive composition or hot-melt adhesive composition directly on the inside surface of each disk substrate instead of the self-adhesive sheet E.

EXAMPLE 4

A self-adhesive sheet F was prepared which was approximately the same as sheet E except that the adhesive layer (9) was provided on the surface with channels (97) as shown in FIG. 10. The self-adhesive layer (9) had linear parallel channels (97) of rectangular cross section formed therein having a depth of 10 µm, a width L1 of 0.07 cm, and a pitch L1+L2 of 0.17 cm. The proportion of lands, L2/(L1+L2), was equal to 0.6.

Sample No. 23 was prepared by the same procedure as sample No. 21 except that self-adhesive sheet F was used instead of sheet E. The disk substrates were mated such that the channels in the self-adhesive sheet of one disk substrate extended substantially perpendicular to the channels in the self-adhesive sheet of the other disk substrate.

Sample No. 23 was observed by shadowing to find no air bubbles between the buffer sheet (3) and the adhesive layer (9).

Sample No. 23 was also examined by the same test as sample No. 21, finding an acceptably low maximum runout. In addition, sample No. 23 provided lower instantaneous runout acceleration than sample Nos. 21 and 22 due to the absence of air bubbles.

With respect to error rate, sample No. 23 was approximately equal both before and after storage in an environment at a temperature of 80° C. and a relative humidity of 80% for 2,000 hours.

Sample No. 23 also had a fully high bond strength.

Equivalent results are obtained when magneto-optic recording disks are prepared by changing the type and thickness of the buffer sheet or the shape, dimensions and pattern of channels, and when read-only double side optical video disks are prepared.

These data demonstrate the effectiveness of the invention.

BENEFITS OF THE INVENTION

The optical disk in the first form of the invention is free of air bubbles between the disk substrate and the self-adhesive layer or within the self-adhesive layer. A wide area is thus available for bonding, leading to an increased bond strength. The eliminated inclusion of air bubbles ensures the manufacture of optical disks with high mechanical precision, particularly because any desired proportion of bondcontributing lands in the self-adhesive layer can be achieved simply by adjusting the pattern of channels in the self-adhesive layer.

The mechanical and dimensional precisions of the disk are further improved by using a self-adhesive sheet having a foam base which can accommodate irregularities on the inside surface of the disk substrates.

Because of high mechanical precision, the optical disk of the invention experiences minimum runout and focusing error during rotational operation.

Corrosion resistance, durability and reliability are improved since the self-adhesive layer is substantially entirely over the inside surface of the disk substrates. Even after long-term storage in a high temperature/high humidity environment, satisfactory recording/reproducing operation can be performed with minimized errors.

The optical disk in the second form of the invention is characterized by high mechanical precision. The disk insures satisfactory recording/reproducing operation since it experiences minimal runout during rotation. Occurrence of focusing errors and tracking errors is minimized.

We claim:

1. An optical disk comprising:
 a pair of disk substrates each having inside and outside surfaces and inner and outer circumferential edges and adapted to be mated such that their inside surfaces face each other;
 information carrying means comprising a magneto-optical recording material on at least one disk substrate inside surface;
 a pair of self-adhesive layers adjacent each of the respective substrate inside surfaces, a multiplicity of linear channels being formed entirely in at least one self-adhesive layer of said pair of self-adhesive layers and extending from the inner circumferential edge to the outer circumferential edge of said disk substrate joining said at least one self-adhesive layer; and
 wherein said self-adhesive layers are bonded together to integrate the pair of disk substrates.

2. The optical disk of claim 1, which further comprises at least one self-adhesive sheet including a foam base member having a compression hardness of up to 10 kgf/cm$^2$ and first and second major surfaces, said self-adhesive layer being formed on the first major surface, and an additional self-adhesive layer being formed on the second major surface, said self-adhesive sheet being attached to either one of the inside surfaces of said disk substrate via said additional self-adhesive layer.

3. The optical disk of claim 1, wherein the inside surface of said disk substrate is covered over substantially the entire area thereof with said self-adhesive layer or said second self-adhesive layer.

4. The optical disk of claim 1, wherein each of the self-adhesive layers is formed with a plurality of channels.

5. The optical disk of claim 1 wherein said channels extend radially between the inner and outer circumferential edges.

6. The optical disk of claim 1, wherein said at least one self-adhesive layer is formed with continuous lands between the respective channels.

7. The optical disk of claim 1, wherein each of said self-adhesive layer is formed with discontinuous lands between the respective channels.

8. The optical disk of claim 1, wherein the inside surface of said disk substrate is covered over substantially the entire area thereof with said self adhesive layer.

9. The optical disk of claim 1, wherein the depth of each of said plurality of channels is at least about 10% of the thickness of the self-adhesive layer.

10. The optical disk of claim 1, wherein the thickness of the adhesive layer is 10–200 um.

11. The optical disk of claim 2, wherein the inside surface of said disk substrate is covered over substantially the entire area thereof with said self-adhesive layer or said second self-adhesive layer.

12. The optical disk of claim 2, wherein the inside surface of said disk substrate is covered over substantially the entire area thereof with said self adhesive layer.

13. The optical disk of claim 1, wherein said channels are parallel to one another.

14. The optical disk of claim 6, wherein said channels are formed in a parallel arrangement with a density of at least one channel per cm of said adhesive layers and the lands occupy at least 30% of the surface area thereof.

15. The optical disk of claim 6, wherein said channels are formed radially in a density of at least one channel per cm of said adhesive layers as measured along the outer circumferential edge of the disk substrate and the lands occupy at least 30% of the surface area thereof.

16. The optical disk of claim 14, wherein the lands occupy 30 to 90% of the surface area of said self-adhesive layers.

17. An optical disk comprising:
 a pair of disk substrates each having inside and outside surfaces and inner and outer circumferential edges and adapted to be mated such that their inside surfaces face each other;
 information carrying means comprising a magneto-optical recording material on at least one disk substrate inside surface;
 a pair of adhesive layers adjacent each of the respective substrate inside surfaces outside of said information carrying means and at least one of each of the adhesive layers in said pair of adhesive layers includes a multiplicity of integrally formed linear channels being formed entirely in said at least one adhesive layer, and extending from the inner circumferential edge to the outer circumferential edge of said disk substrate joining said at least one self-adhesive layer;
 a buffer foam sheet having a compression hardness of up to 10 kgf/cm$^2$; and
 wherein said adhesive layers are bonded through the buffer foam sheet to integrate the pair of disk substrates.

18. The optical disk of claim 17 wherein said buffer foam sheet has a compression hardness of up to 10 kgf/cm$^2$.

19. The optical disk of claim 17 which, further comprises at least one self-adhesive sheet including a base having first and second major surfaces, one of said pair of adhesive layers being formed on the first major surface and formed from a self-adhesive composition, and the other of said pair of adhesive layers being formed on the second major surface, said adhesive sheet being attached to either one of the disk substrate inside surfaces via said other of said pair of adhesive layers.

20. The optical disk of claim 17, wherein each one of the adhesive layers of said pair of adhesive layers is formed adjacent at least one disk substrate inside surface from a self-adhesive composition.

21. The optical disk of claim 17, wherein each one of the adhesive layers are formed adjacent the respective disk substrate inside surfaces from a hot-melt adhesive composition.

22. The optical disk of claim 17, wherein the inside surface of said disk substrate is covered over substantially the entire area thereof with said self adhesive layer.

23. The optical disk of claim 17, wherein the depth of each of said plurality of channels is at least about 10% of the thickness of the self-adhesive layer.

24. The optical disk of claim 17, wherein the thickness of the adhesive layer is 10–200 um.

25. The optical disk of claim 19, wherein the inside surface of said disk substrate is covered over substantially the entire area thereof with said self-adhesive layer or said second self-adhesive layer.

26. The optical disk of claim 19, wherein the inside surface of said disk substrate is covered over substantially the entire area thereof with said self adhesive layer.

* * * * *